(12) United States Patent
Sun et al.

(10) Patent No.: US 12,712,819 B2
(45) Date of Patent: Aug. 18, 2026

(54) COMMUNICATION METHOD AND APPARATUS

(71) Applicant: Huawei Technologies Co., Ltd., Shenzhen (CN)

(72) Inventors: Haiyang Sun, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/038,567

(22) Filed: Jan. 27, 2025

(65) Prior Publication Data

US 2025/0175435 A1 May 29, 2025

Related U.S. Application Data

(63) Continuation of application No. PCT/CN2023/107883, filed on Jul. 18, 2023.

(30) Foreign Application Priority Data

Jul. 29, 2022 (CN) ......................... 202210907662.1

(51) Int. Cl.
*H04L 47/283* (2022.01)

(52) U.S. Cl.
CPC .................................. *H04L 47/283* (2013.01)

(58) Field of Classification Search
CPC ... H04L 47/28; H04L 47/283; H04L 47/2416; H04L 12/18; H04L 43/0829;
(Continued)

(56) References Cited

U.S. PATENT DOCUMENTS

2019/0229903 A1 * 7/2019 Balasubramanian ........................ H04L 9/0631
2019/0245895 A1 * 8/2019 Balasaygun ........ H04L 65/1104
(Continued)

FOREIGN PATENT DOCUMENTS

CN 111200848 A 5/2020
CN 114125924 A 3/2022
WO 2020252642 A1 12/2020

OTHER PUBLICATIONS

NTT Docomo et al: "KI #5, Merging the Solutions 9 and 10," 3GPP SA WG2 Meeting #151E (e-meeting), May 16-20, 2022, Elbonia, S2-2204375, total 9 pages.
(Continued)

*Primary Examiner* — Sargon N Nano
(74) *Attorney, Agent, or Firm* — Slater Matsil, LLP

(57) ABSTRACT

A system and method, the method including determining, by a centralized user configuration function based on a core network packet delay budget (CN PDB) and a buffer duration, an allowed maximum latency of a time-sensitive network (TSN) stream transmitted between an access network device and a user plane network element, wherein the maximum latency does not exceed a difference obtained by subtracting the buffer duration from the CN PDB, sending, by the centralized user configuration function, first latency information to a centralized network configuration function, wherein the first latency information indicates the maximum latency, receiving, by the centralized user configuration function, first configuration information, wherein the first configuration information indicates a packet transmission time of the transmit end of the TSN stream, and the packet transmission time is associated with the maximum latency, and sending the first configuration information to the transmit end of the TSN stream.

20 Claims, 7 Drawing Sheets

(58) Field of Classification Search
CPC .... H04L 43/087; H04W 24/02; H04W 24/08; H04W 28/0268; H04W 28/02; G06F 1/3203
USPC .......................................................... 709/238
See application file for complete search history.

(56) References Cited

U.S. PATENT DOCUMENTS

| | | | | |
|---|---|---|---|---|
| 2019/0306042 | A1* | 10/2019 | Choi | H04L 43/106 |
| 2019/0364226 | A1* | 11/2019 | Zheng | F21V 21/30 |
| 2019/0372880 | A1* | 12/2019 | Pruden | H04L 43/18 |
| 2020/0137163 | A1* | 4/2020 | Baghsorkhi | G06F 9/541 |
| 2020/0252141 | A1* | 8/2020 | Sarajedini | H02J 50/90 |
| 2020/0374567 | A1* | 11/2020 | Tokumo | H04N 21/472 |
| 2021/0111867 | A1* | 4/2021 | Lin | H04L 63/126 |

OTHER PUBLICATIONS

3GPP TR 23.700-25 vo.3.0 (May 2022), “3rd Generation Partnership Project; Technical Specification Group Services and System Aspects; Study on timing resiliency and TSC and URLLC enhancements (Release 18),” total 84 pages.

IEEE Standard for Local and metropolitan area networks—Station and Media Access Control Connectivity Discovery Sponsored by the LAN/MAN Standards Committee IEEE 3 Park Avenue New York, NY 10016-5997 USA IEEE Computer Society IEEE Std 802.1AB 2016 (Revision of IEEE Std 802.1AB-2009, Approved Jan. 29, 2016, total 146 pages.

IEEE Standard forLocal and metropolitan area networksMedia Access Control (MAC) Bridges and Virtual Bridge Local Area NetworksIEEE Computer SocietySponsored by theLAN/MAN Standards Committee, IEEE Std 802.1Q 2011, Aug. 31, 2011, total 1365 pages.

IEEE Standard for Local and Metropolitan Area Networks-Bridges and Bridged Networks Amendment 31: Stream Reservation Protocol (SRP) Enhancements and Performance Improvements Sponsored by theLAN/MAN Standards Committee, IEEE Std 802.1Qcc-2018, Approved Jun. 14, 2018, total 208 pages.

3GPP TS 23.502 V17.5.0 (Jul. 2022) Technical Specification 3rd Generation Partnership Project; Technical Specification Group Services and System Aspects; Procedures for the 5G System (5GS); Stage 2 Release 17, total 744 pages.

3GPP TR 23.700-25 V0.2.0 (Apr. 2022) Technical Report 3rd Generation Partnership Project; Technical Specification Group Services and System Aspects; Study on timing resiliency and TSC and URLLC enhancements Release 18, total 55 pages.

* cited by examiner

CUC

User/Network configuration information

CNC

Manage

Bridge

Bridge

Bridge

Bridge

Receive end

Transmit end

COMMUNICATION METHOD AND APPARATUS

CROSS-REFERENCE TO RELATED APPLICATIONS

This application is a continuation of International Application No. PCT/CN2023/107883, filed on Jul. 18, 2023, which claims priority to Chinese Patent Application No. 202210907662.1, filed on Jul. 29, 2022. The disclosures of the aforementioned applications are hereby incorporated by reference in their entireties.

TECHNICAL FIELD

Embodiments of this application relate to the communication field, and in particular, to a communication method and an apparatus.

BACKGROUND

To meet a requirement for reliable latency transmission, the institute of electrical and electronics engineers (IEEE) defines a time-sensitive network (TSN) standard. This standard provides a reliable latency transmission service based on layer 2 switching, to ensure a transmission reliability of latency-sensitive service data and a predictable end-to-end transmission latency.

In a system architecture for interworking between a 3rd generation partnership project (3GPP) and a TSN, an access network device and a user plane network element may be used as a transmit end or a receive end that are of a TSN stream, and a control plane network element in a 5th generation system (5GS) may be used as a centralized network configuration function in the TSN.

In the foregoing system architecture, the control plane network element binds, to a quality of service (QOS) flow, the TSN stream transmitted between the access network device and the user plane network element. A current solution cannot ensure the following: A transmission latency of a data frame that is in the TSN stream and that is between the access network device and the user plane network element meets an allowed maximum latency of the TSN stream. In addition, a transmission latency of the data frame between a terminal device and the user network element further meets a data packet delay budget corresponding to the QoS flow.

SUMMARY

Embodiments of this application provide a communication method and a communication apparatus, so that in a scenario in which a time-sensitive network (TSN) interworks with a 3rd generation partnership project (3GPP), both an end-to-end latency between a transmit end and a receive end that are of a TSN stream and an end-to-end latency between a terminal device and a user plane network element meet a requirement.

According to a first aspect, a communication method is provided. The method may be performed by a centralized user configuration function, or may be performed by a component (for example, a chip or a circuit) of the centralized user configuration function. This is not limited herein. For ease of description, the following uses an example in which the method is performed by the centralized user configuration function for description.

The method includes: A centralized user configuration function determines, based on a core network (CN) data packet delay budget (PDB) and buffer duration, an allowed maximum latency of a TSN stream transmitted between an access network device and a user plane network element. The maximum latency does not exceed a difference obtained by subtracting the buffer duration from the CN PDB. The access network device is a transmit end of the TSN stream, and the user plane network element is a receive end of the TSN stream, or the access network device is the receive end of the TSN stream, and the user plane network element is the transmit end of the TSN stream. The centralized user configuration function sends first latency information to a centralized network configuration function. The first latency information indicates the maximum latency. The centralized user configuration function receives first configuration information from the centralized network configuration function. The first configuration information indicates a packet transmission time of the transmit end of the TSN stream, and the packet transmission time indicated by the first configuration information is determined based on the maximum latency. The centralized user configuration function sends the first configuration information to the transmit end of the TSN stream.

Based on the foregoing technical solution, the centralized user configuration function sends the first latency information to the centralized network configuration function, so that the centralized network configuration function can obtain, based on the first latency information, the allowed maximum latency of the transmit end of the TSN stream. Further, the centralized network configuration function may determine, based on the allowed maximum latency of the transmit end of the TSN stream, a packet transmission time that meets a latency requirement. To be specific, when the transmit end of the TSN stream sends a data frame based on the packet transmission time, a transmission latency of the data frame between the transmit end of the TSN stream and the receive end of the TSN stream does not exceed the allowed maximum latency of the TSN stream.

In addition, the allowed maximum latency that is of the TSN stream and that is indicated by the first latency information does not exceed the difference obtained by subtracting the buffer duration from the CN PDB, so that an end-to-end latency between a terminal device and the user plane network element can also be met. This is because, based on a latency requirement of the allowed maximum latency of the TSN stream, maximum transmission duration of the data frame between the transmit end and the receive end that are of the TSN stream is equal to the allowed maximum latency of the TSN stream. If the transmit end of the TSN stream does not immediately send the data frame but buffers the data frame for a period of time after receiving the data frame, a maximum transmission latency of the data frame between the transmit end and the receive end that are of the TSN stream is equal to a sum of the allowed maximum latency of the TSN stream and the buffer duration. In other words, a transmission latency of the data frame between the transmit end and the receive end that are of the TSN stream does not exceed the CN PDB. In this case, the end-to-end latency between the terminal device and the user plane network element can be met.

With reference to the first aspect, in some implementations of the first aspect, the method further includes: The centralized user plane configuration function determines the buffer duration, where the buffer duration includes: actual buffer duration for buffering a data frame by the transmit end of the TSN stream, or maximum possible buffer duration for buffering the data frame by the transmit end of the TSN stream.

Based on the foregoing technical solution, the centralized user configuration function may determine the actual buffer duration, and determine the maximum latency based on the actual buffer duration, so that the centralized user configuration function does not determine an excessively small maximum latency, to avoid a case in which a capability of a transport network is insufficient to meet the maximum latency.

Alternatively, the centralized user configuration function may determine the maximum possible buffer duration, and determine the maximum latency based on the maximum possible buffer duration. Further, when the centralized network configuration function determines the packet transmission time of the TSN stream based on the maximum latency, regardless of a value of the packet transmission time determined by the centralized network configuration function, both a latency between the transmit end and the receive end that are of the TSN stream and the end-to-end latency between the terminal device and the user plane network element can be met.

With reference to the first aspect, in some implementations of the first aspect, the buffer duration includes the maximum possible buffer duration. That the centralized user plane configuration function determines the buffer duration includes: The centralized user configuration function determines that the maximum possible buffer duration is duration of a difference between an allowed latest packet transmission time of the transmit end of the TSN stream and an allowed earliest packet transmission time of the transmit end of the TSN stream.

With reference to the first aspect, in some implementations of the first aspect, the buffer duration includes the maximum buffer duration. That the centralized user plane configuration function determines the buffer duration includes: The centralized user configuration function determines that the maximum possible buffer duration is a smaller one of the following two pieces of duration: duration of a difference between an allowed latest packet transmission time of the transmit end of the TSN stream and an allowed earliest packet transmission time of the transmit end of the TSN stream, and maximum buffer duration supported by the transmit end of the TSN stream.

With reference to the first aspect, in some implementations of the first aspect, the buffer duration includes the actual buffer duration, and the method further includes: The centralized user configuration function receives second configuration information from the centralized network configuration function. The second configuration information indicates a packet transmission time of the transmit end of the TSN stream. That the centralized user configuration function determines the buffer duration includes: The centralized user configuration function determines that the actual buffer duration is duration of a difference between the packet transmission time indicated by the second configuration information and an earliest packet transmission time.

With reference to the first aspect, in some implementations of the first aspect, if the packet transmission time indicated by the first configuration information is different from the packet transmission time indicated by the second configuration information, the method further includes: The centralized user configuration function determines, based on the CN PDB and updated actual buffer duration, an updated allowed maximum latency of the TSN stream. The updated maximum latency does not exceed a difference obtained by subtracting the updated actual buffer duration from the CN PDB, and the updated actual buffer duration is duration of a difference between the packet transmission time indicated by the first configuration information and the earliest packet transmission time. The centralized user configuration function sends second latency information to the centralized network configuration function. The second latency information indicates the updated maximum latency. The centralized user configuration function receives third configuration information from the centralized network configuration information. The third configuration information indicates a packet transmission time of the transmit end of the TSN stream, and the packet transmission time indicated by the third configuration information is determined based on the updated maximum latency. The centralized user configuration function sends the third configuration information to the transmit end of the TSN stream.

With reference to the first aspect, in some implementations of the first aspect, the updated actual buffer duration is greater than the actual buffer duration.

With reference to the first aspect, in some implementations of the first aspect, the packet transmission time indicated by the first configuration information is the same as the packet transmission time indicated by the second configuration information, and the method further includes: The centralized user configuration function sends first information to the centralized network configuration function based on the packet transmission time indicated by the second configuration information. The first information indicates the earliest packet transmission time and a latest packet transmission time, and the earliest packet transmission time and the latest packet transmission time each are the same as the packet transmission time indicated by the second configuration information.

Based on the foregoing technical solution, the earliest packet transmission time and the latest packet transmission time that are indicated by the first information each are the same as the packet transmission time indicated by the second configuration information. Therefore, the packet transmission time that is of the transmit end of the TSN stream and that is determined by the centralized network configuration function based on the first information is the same as the packet transmission time indicated by the second configuration information. In other words, the packet transmission time indicated by the first configuration information is the same as the packet transmission time indicated by the second configuration information. In a case in which the packet transmission time indicated by the first configuration information is the same as the packet transmission time indicated by the second configuration information, it can be ensured that both an end-to-end latency between the transmit end and the receive end that are of the TSN stream and the end-to-end latency between the terminal device and the user plane network element are met. This is because, if the packet transmission time indicated by the first configuration information is different from the packet transmission time indicated by the second configuration information, when the transmit end of the TSN stream sends the data frame based on the packet transmission time indicated by the first configuration information, buffer duration of the data frame at the transmit end of the TSN stream may be greater than the actual buffer duration. Consequently, the transmission latency of the data frame between the transmit end and the receive end that are of the TSN stream exceeds the CN PDB, and further, the end-to-end latency between the terminal device and the user plane network element cannot be met. Therefore, in a case in which the earliest packet transmission time and the latest packet transmission time that are indicated by the first information each are the same as the packet transmission time indicated by the second configuration information, it can be ensured that both the end-to-end latency between the transmit end and the receive end that are of the TSN stream and the end-to-end latency between the terminal device and the user plane network element are met.

With reference to the first aspect, in some implementations of the first aspect, the packet transmission time indicated by the first configuration information is between the allowed earliest packet transmission time of the transmit end of the TSN stream and the allowed latest packet transmission time of the transmit end of the TSN stream, and the method further includes: The centralized user configuration function sends the first information to the centralized network configuration function based on the maximum buffer duration supported by the transmit end of the TSN stream. The first information indicates the earliest packet transmission time and the latest packet transmission time, and the duration of the difference between the latest packet transmission time and the earliest packet transmission time does not exceed the maximum buffer duration supported by the transmit end of the TSN stream.

Based on the foregoing technical solution, because duration for buffering the data frame by the transmit end of the TSN stream does not exceed the maximum buffer duration supported by the TSN stream, in a case in which it is ensured that the duration of the difference between the allowed latest packet transmission time of the transmit end of the TSN stream and the earliest packet transmission time of the TSN stream does not exceed the maximum buffer duration supported by the TSN stream, the determined latest packet transmission time of the TSN stream is more appropriate.

With reference to the first aspect, in some implementations of the first aspect, the method further includes: The centralized user configuration function receives capability information from the transmit end of the TSN stream. The capability information indicates the maximum buffer duration supported by the transmit end of the TSN stream.

With reference to the first aspect, in some implementations of the first aspect, that a centralized user configuration function determines, based on a CN PDB and buffer duration, an allowed maximum latency of a time-sensitive network TSN stream transmitted between an access network device and a user plane network element includes: The centralized user configuration function determines the maximum latency based on the CN PDB, the buffer duration, and residence duration at the user plane network element. The maximum latency does not exceed a difference obtained by subtracting a sum of the buffer duration and the residence duration from the CN PDB.

Based on the foregoing technical solution, in a case in which the maximum latency does not exceed the difference obtained by subtracting the sum of the buffer duration and the residence duration from the CN PDB, even if the residence duration at the user plane network element is long, both the latency between the transmit end and the receive end that are of the TSN stream and the end-to-end latency between the terminal device and the user plane network element can be met.

According to a second aspect, an apparatus is provided. The apparatus may be a centralized user configuration function or a component in the centralized user configuration function. The apparatus may include modules or units configured to perform the method according to any one of the first aspect and the possible implementations of the first aspect.

According to a third aspect, a communication apparatus is provided, including a processor. The processor is coupled to a memory, and may be configured to execute instructions in the memory, to implement the method according to any one of the first aspect and the possible implementations of the first aspect. Optionally, the communication apparatus further includes the memory. Optionally, the communication apparatus further includes a communication interface, and the processor is coupled to the communication interface.

In an implementation, the communication apparatus is a centralized user configuration function. When the communication apparatus is the centralized user configuration function, the communication interface may be a transceiver or an input/output interface.

In another implementation, the communication apparatus is a chip configured in the centralized user configuration function. When the communication apparatus is the chip configured in the centralized user configuration function, the communication interface may be an input/output interface.

Optionally, the transceiver may be a transceiver circuit. Optionally, the input/output interface may be an input/output circuit.

According to a fourth aspect, a processor is provided, including: an input circuit, an output circuit, and a processing circuit. The processing circuit is configured to receive a signal through the input circuit, and transmit a signal through the output circuit, to enable the processor to perform the method according to any one of the possible implementations of the first aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, and a signal output by the output circuit may be output to, for example, but not limited to, a transmitter and transmitted by the transmitter. In addition, the input circuit and the output circuit may be a same circuit, where the circuit is used as the input circuit and the output circuit at different moments. Specific implementations of the processor and the various circuits are not limited in embodiments of this application.

According to a fifth aspect, a processing apparatus is provided, including a processor and a memory. The processor is configured to read instructions stored in the memory, receive a signal through a receiver, and transmit a signal through a transmitter, to perform the method according to any one of the possible implementations of the first aspect.

Optionally, there are one or more processors, and there are one or more memories.

Optionally, the memory may be integrated with the processor, or the memory and the processor may be disposed separately.

In a specific implementation process, the memory may be a non-transitory ( ) memory, such as a read-only memory (ROM). The memory and the processor may be integrated into one chip, or may be separately disposed in different chips. A type of the memory and a manner in which the memory and the processor are disposed are not limited in embodiments of this application.

It should be understood that a related data exchange process, for example, sending of configuration information, may be a process of outputting the configuration information from the processor, and receiving of configuration information, may be a process of receiving and inputting the configuration information by the processor. Specifically, data output by the processor may be output to the transmitter, and input data received by the processor may be from the receiver. The transmitter and the receiver may be collectively referred to as a transceiver.

The processing apparatus in the fifth aspect may be one or more chips. The processor in the processing apparatus may be implemented by hardware, or may be implemented by software. When the hardware is used for implementation, the processor may be a logic circuit, an integrated circuit, or the like. When the software is used for implementation, the processor may be a general-purpose processor, and is implemented by reading software code stored in the memory. The memory may be integrated into the processor, or may be located outside the processor and exist independently.

According to a sixth aspect, a computer program product is provided. The computer program product includes: a computer program (which may also be referred to as code or instructions). When the computer program is executed, a computer is enabled to perform the method according to any one of the possible implementations of the first aspect.

According to a seventh aspect, a computer-readable storage medium is provided. The computer-readable storage medium stores a computer program (which may also be referred to as code or instructions). When the computer program is run on a computer, the method according to any one of the possible implementations of the first aspect is performed.

According to an eighth aspect, a communication system is provided, including a centralized network configuration function and the foregoing centralized user configuration function. The centralized user configuration function is configured to perform the method according to any one of the first aspect and the possible implementations of the first aspect.

DETAILED DESCRIPTION OF ILLUSTRATIVE EMBODIMENTS

Figures 1, 2:
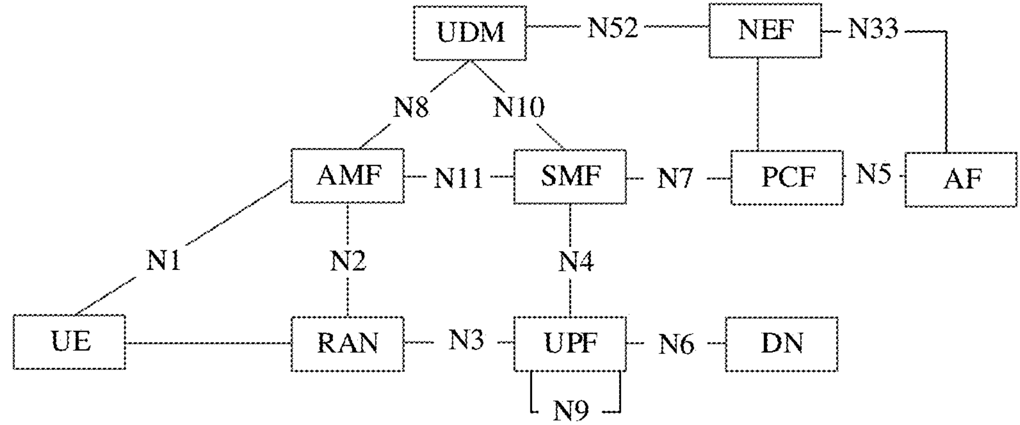
FIG. 1 is a schematic diagram of a communication system to which a method according to an embodiment of this application is applicable.
FIG. 2 is a schematic diagram of a configuration model of a TSN.

The following describes the technical solutions in embodiments of this application with reference to the accompanying drawings.

The technical solutions in embodiments of this application are applicable to various communication systems, for example, a long term evolution (LTE) system, a frequency division duplex (FDD) system, a time division duplex (TDD) system, a universal mobile telecommunications system (UMTS), a worldwide interoperability for microwave access (WiMAX) communication system, a 5th generation (5G) system or a new radio (NR) system, a 6th generation (6G) system, or a future communication system. A 5G mobile communication system described in this application includes a non-standalone (NSA) 5G mobile communication system or a standalone (SA) 5G mobile communication system. The communication system may alternatively be a public land mobile network (public land mobile network, PLMN), a device-to-device (D2D) communication system, a machine to machine (M2M) communication system, an internet of things (IoT) communication system, a vehicle-to-everything (V2X) communication system, an uncrewed aerial vehicle (UAV) communication system, or another communication system.

The following describes the technical solutions in embodiments of this application with reference to the accompanying drawings in embodiments of this application. Unless otherwise specified, "/" in descriptions of this application represents an "or" relationship between associated objects. For example, A/B may represent A or B. A "and/or" in this application describes only an association relationship for describing associated objects and represents that three relationships may exist. For example, A and/or B may represent three cases: Only A exists, both A and B exist, and only B exists, where A and B may be singular or plural. In addition, in the descriptions of this application, unless otherwise specified, "a plurality of" means two or more than two. "At least one of the following items (pieces)" or a similar expression thereof refers to any combination of these items, including a singular item (piece) or any combination of plural items (pieces). For example, at least one of a, b, or c may represent: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In embodiments of this application, terms such as "example" or "for example" is used for representing giving an example, an illustration, or a description. Any embodiment or design solution described as "example" or "for example" in embodiments of this application should not be explained as being more preferred or having more advantages than another embodiment or design solution. Exactly, use of the words such as "example" or "for example" is intended to present a related concept in a specific manner for ease of understanding.

In addition, a network architecture and a service scenario described in embodiments of this application are intended to describe the technical solutions in embodiments of this application more clearly, and do not constitute a limitation on the technical solutions provided in embodiments of this application. A person of ordinary skill in the art may know that, with the evolution of the network architecture and the emergence of new service scenarios, the technical solutions provided in embodiments of this application are also applicable to similar technical problems.

FIG. 1 shows an application scenario to which an embodiment of this application is applicable.

1. User equipment (UE): The user equipment may be referred to as a terminal device, a terminal, an access terminal, a subscriber unit, a subscriber station, a mobile station, a remote station, a remote terminal, a mobile device, a user terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, an uncrewed aerial vehicle, a wearable device, a terminal device in a future communication system, or the like. This is not limited in embodiments of this application.

2. Access network (AN): The access network provides a network access function for an authorized user in a specific area and can use transmission tunnels of different quality based on a user level, a service requirement, and the like. The access network may be an access network that uses different access technologies. A current access network technology includes: a radio access network technology used in a 3rd generation (3G) system, a radio access network technology used in a 4th generation (4G) system, or a next generation radio access network (NG-RAN) technology (for example, a radio access technology used in a 5G system).

An access network that implements a network access function based on a radio communication technology may be referred to as a radio access network (radio access network, RAN). The radio access network can manage radio resources, provide an access service for a terminal, and further forward a control signal and user data between the terminal and a core network.

A radio access network device may be, for example, a NodeB, an evolved NodeB (eNB, or eNodeB), a next generation node base station (gNB) in a 5G mobile communication system, a base station in a future mobile communication system, or an access point (AP) in a Wi-Fi wireless hotspot system, or may be a radio controller in a cloud radio access network (CRAN) scenario. Alternatively, the radio access network device may be a relay station, an access point, a vehicle-mounted device, an uncrewed aerial vehicle, a wearable device, a network device in a 5G network, a network device in an evolved PLMN, or the like. A specific technology and a specific device form that are used by the radio access network device are not limited in embodiments of this application.

3. Access management network element: The access management network element is mainly configured to perform mobility management and access management, is responsible for transferring a user policy and the like between user equipment and a policy control function (PCF) network element, and may be configured to implement a function, for example, an access authorization (authentication) function, other than session management in functions of a mobility management entity (MME).

In a 5G communication system, the access management network element may be an access and mobility management function (AMF) network element. In a future communication system, the access management network element may still be the AMF network element, or may have another name. This is not limited in this application.

4. Session management network element: The session management network element is mainly configured to manage a session, allocate and manage an internet protocol (Internet protocol, IP) address of user equipment, select an endpoint that can manage a user plane function interface and a policy control and charging function interface, perform downlink data communication, and the like.

In a 5G communication system, the session management network element may be a session management function (SMF) network element. In a future communication system, the session management network element may still be the SMF network element, or may have another name. This is not limited in this application.

5. User plane network element: The user plane network element is configured to perform functions such as packet routing and forwarding, quality of service (quality of service, QoS) processing of user plane data, forwarding of the user plane data, charging statistics based on a session/flow level, and bandwidth throttling.

In a 5G communication system, the user plane network element may be a user plane function (UPF) network element. In a future communication system, the user plane network element may still be the UPF network element, or may have another name. This is not limited in this application.

6. Data network element: The data network element is configured to provide a network for data transmission.

In a 5G communication system, the data network element may be a data network (DN) network element. In a future communication system, the data network element may still be the DN network element, or may have another name. This is not limited in this application.

7. Policy control network element: The policy control network element is configured to guide a unified policy framework of network behavior, and provide policy rule information for a control plane function network element (such as an AMF network element or an SMF network element), and the like.

In a 4G communication system, the policy control network element may be a policy and charging rules function (PCRF) network element. In a 5G communication system, the policy control network element may be a policy control function (PCF) network element. In a future communication system, the policy control network element may still be the PCF network element, or may have another name. This is not limited in this application.

8. Data management network element: The data management network element is configured to process an identifier of user equipment, perform access authentication, registration, and mobility management, and the like.

In a 5G communication system, the data management network element may be a unified data management (UDM) network element. In a 4G communication system, the data management network element may be a home subscriber server (HSS) network element. In a future communication system, the data management network element may still be the UDM network element, or may have another name. This is not limited in this application.

9. Network exposure function (exposure function, NEF) network element: The network exposure function network element is configured to securely expose, to the outside, a service, a capability, and the like that are provided by a 3rd generation partnership project (3GPP) network function.

10. Application function (application function, AF) network element: The application function network element provides an application-layer service for UE. When providing the service for the UE, the AF has a requirement on a QoS policy and a charging policy (charging) and needs to notify a network. In addition, the AF also needs application-related information fed back by a core network. The AF may have all functions of the AF defined in the technical specification (TS) 23.501 R-15 version, and have a related function used for an application service. In other words, in a user plane architecture, an application server and the UE perform user plane communication through a UE-RAN-UPF-AF path. In a control plane architecture, the AF may further perform communication with another network function (NF) in a 5G core network (5GC) through a NEF. For example, the AF performs communication with a PCF through the NEF. If the AF is arranged by an operator of a 5GC, the AF may further be in the control plane architecture, to be specific, the AF is in a trusted domain, and directly communicates with another NF, for example, directly communicates with the PCF in the 5GC without using the NEF.

In FIG. 1, N1, N2, N3, N4, N5, N6, N7, N8, N9, N10, N33, and N52 are interface sequence numbers. For meanings of these interface sequence numbers, refer to meanings defined in 3GPP TS 23.501.

It should be understood that the foregoing network architecture applied to embodiments of this application is merely an example for description, and a network architecture applicable to embodiments of this application is not limited thereto. Any network architecture that can implement the functions of the foregoing network elements is applicable to embodiments of this application.

It should be further understood that the AMF, SMF, UPF, NEF, PCF, the UDM, and the like that are shown in FIG. 1 may be understood as network elements configured to implement different functions in a core network, for example, may be combined into a network slice as required. These core network elements may be independent devices, or may be integrated into a same device to implement different functions. Specific forms of the foregoing network elements are not limited in this application.

It should be further understood that the foregoing names are defined merely for distinguishing between different functions, and should not constitute any limitation on this application. This application does not exclude a possibility of using other names in the 5G network and another future network. For example, in a 6G network, some or all of the foregoing networks may still use terms in 5G, or may use other names. Names of interfaces between the foregoing network elements in FIG. 1 are merely examples, and the interfaces may have other names during specific implementation. This is not specifically limited in this application. In addition, names of messages (or signaling) transmitted between the foregoing network elements are merely examples, and do not constitute any limitation on functions of the messages.

In a forwarding process of a conventional ethernet network, when a large quantity of data packets arrive at a forwarding port in an instant, a problem such as a large forwarding latency or packet loss is caused. Therefore, the conventional ethernet network cannot provide a service with high reliability and a guaranteed transmission latency, and cannot meet requirements of fields such as vehicle control and an industrial internet. To meet a requirement for reliable latency transmission, the institute of electrical and electronics engineers (IEEE) defines a time-sensitive network (TSN) standard. This standard provides a reliable latency transmission service based on layer 2 switching, to ensure transmission reliability of latency-sensitive service data and a predictable end-to-end transmission latency.

FIG. 2 shows a fully centralized configuration model of a TSN. The configuration model includes: a centralized user configuration (CUC) network element, a centralized network configuration, (CNC) network element, one or more TSN end stations (for example, a receive end and a transmit end that are in FIG. 2), and one or more switching nodes (for example, a bridge (bridge(s)) in FIG. 2). A management plane of the configuration model includes: a CUC network element and a CNC network element.

CUC network element: The CUC network element is configured to manage a TSN end station and a service. For example, the CUC network element is responsible for discovering and managing the TSN end station, obtaining a capability of the TSN end station and a user requirement, sending a requirement of a TSN stream to the CNC network element, and configuring the TSN end station based on an indication of the CNC network element.

CNC network element: The CNC network element is responsible for managing a topology (including a TSN end station and each switching node) of a TSN user plane and capability information of each switching node, calculating an end-to-end (end-to-end, E2E) forwarding path of a TSN stream based on a requirement of the TSN stream, and delivering a scheduling parameter to each switching node.

Switching node: The switching node is configured to report capability information of the switching node and topology information to the CNC network element and schedule and forward a data flow based on a rule delivered by the CNC network element. A specific type of the switching node is not limited in this application. For example, the switching node may be a bridge, a switch, a router, or the like. The following uses an example in which the switching node is the bridge for description.

Transmit end: The transmit end is a transmit end of data. In the configuration model, there may be one or more transmit ends. The transmit end may also be referred to as an initiator, a flow service provider, a talker, or the like, and is uniformly referred to as the transmit end below.

Receive end: The receiver end is a receive end of data. In the configuration model, there may be one or more receive ends. The receive end may also be referred to as an audience, a flow service receiver, a listener, or the like, and is uniformly referred to as the receive end below.

It should be noted that, the transmit end and the receive end herein may be communication apparatuses.

Figure 3:
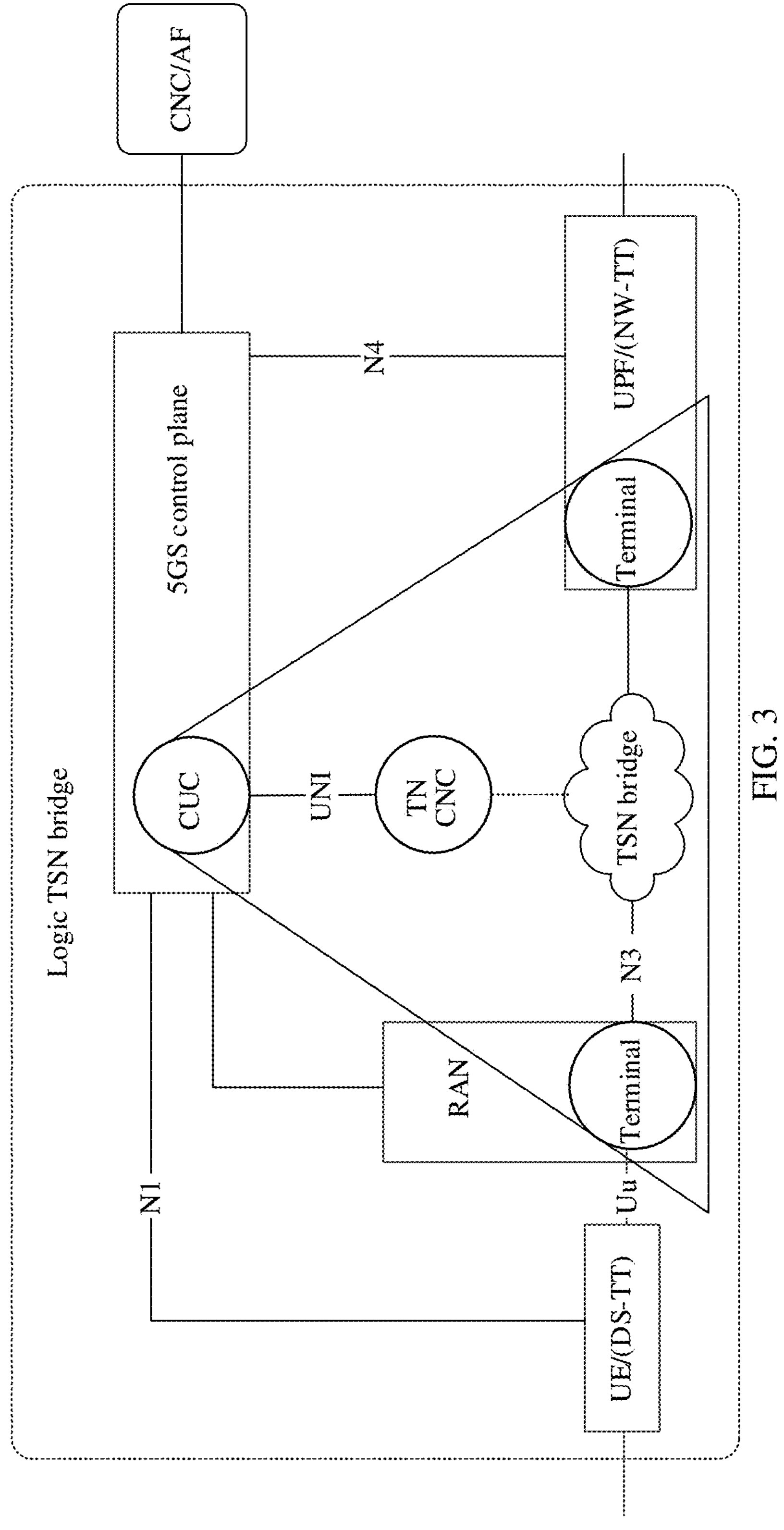
FIG. 3 is a schematic diagram of a network architecture to which a method according to an embodiment of this application is applicable.

FIG. 3 is a schematic diagram of another system architecture for interworking between a 3GPP and a TSN. In the system architecture shown in FIG. 3, if a RAN and a UPF support a capability of a TSN end station, the RAN and the UPF may be respectively used as a transmit end and a receive end that are of a TSN stream. For example, in an uplink direction, the RAN is used as the transmit end of the TSN stream, and the UPF is used as the receive end of the TSN stream. In a downlink direction, the UPF is used as the transmit end of the TSN stream, and the RAN is used as the receive end of the TSN stream. A control plane network element, for example, an SMF in a 5GS may be used as a CUC in the TSN. To be specific, the SMF may obtain talker group information and/or listener group information, and send the talker group information and/or the listener group information to a transport network (TN) CNC through a user/network interface (UNI). Further, the TN CNC configures a bridge in the transport network by using the talker group information and/or the listener group information, and sends status group information to the SMF. Further, the SMF configures the transmit end and the receive end based on the status group information, in other words, configures the RAN and the UPF. It should be noted that, the TN CNC refers to a CNC in the transport network. The transport network is located between the RAN and the UPF, and a service flow transmitted by the transport network is a service flow in a 5G network.

The talker group information obtained by the SMF indicates a transmit end of a single TSN stream, and the listener group information indicates a receive end of the single TSN stream. To be specific, in the system architecture shown in FIG. 3, if the TSN stream is in the uplink direction, the talker group information indicates the RAN, and the listener group information indicates the UPF. If the TSN stream is in the downlink direction, the talker group information indicates the UPF, and the listener group information indicates the RAN.

If the talker group information obtained by the SMF includes a parameter "maximum latency (MaxLatency)", latencies from a data frame sent by the transmit end of the TSN stream to all receive ends need to meet MaxLatency. If the listener group information obtained by the SMF includes the parameter "MaxLatency", a latency from the data frame sent by the transmit end of the TSN stream to a receive end indicated by the listener group information needs to meet "MaxLatency".

Figure 4:
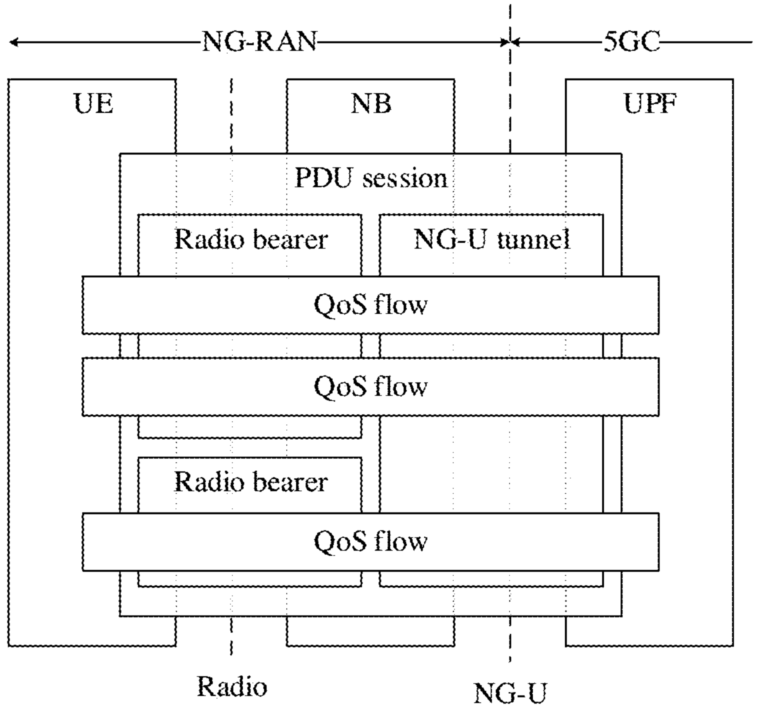
FIG. 4 is a schematic diagram of a QoS model.

In a 5G system, to ensure end-to-end service quality of a service, a 5G QoS model based on a QoS flow is proposed, as shown in FIG. 4. The 5G QoS model supports a guaranteed bit rate (GBR) QoS flow (that is, a GBR QoS flow shown in FIG. 4) and a non-guaranteed bit rate QoS flow (that is, a non-GBR QoS flow shown in FIG. 4). Same transmission processing (such as scheduling or an admission threshold) is performed on data packets controlled by a same QoS flow.

As shown in FIG. 4, one UE may establish one or more protocol data unit (protocol data unit, PDU) sessions with a 5G network, and each PDU session may establish one or more QoS flows. One QoS flow may correspond to one group of characteristic information, where the one group of characteristic information includes a data packet delay budget (packet delay budget, PDB). The PDB defines an upper limit of duration of a possible delay of a data packet between the UE and an N6 termination point of the UPF. The PDB may be split into an access network (AN) PDB and a core network (CN) PDB. The AN PDB defines an upper limit of duration of a possible delay of the data packet between the UE and the RAN. The CN PDB defines an upper limit of duration of a possible delay of the data packet between the RAN and the N6 endpoint of the UPF.

In the system architecture shown in FIG. 3, the SMF binds the TSN stream to one QoS flow, in other words, there is a correspondence between the QoS flow and the TSN stream. In this case, a transmission latency of a data frame that is in the TSN stream and that is between the RAN and the UPF should meet "MaxLatency" in the talker group information and/or the listener group information, and a transmission latency of the data frame between the UE and the UPF should also meet a PDB corresponding to a QoS flow bound to the TSN stream.

In view of this, an embodiment of this application provides a communication method, so that in a scenario in which the TSN interworks with the 5GS, an end-to-end latency between the transmit end and the receive end that are of the TSN stream and an end-to-end latency between the UE and the UPF both meet a requirement.

Figure 5:
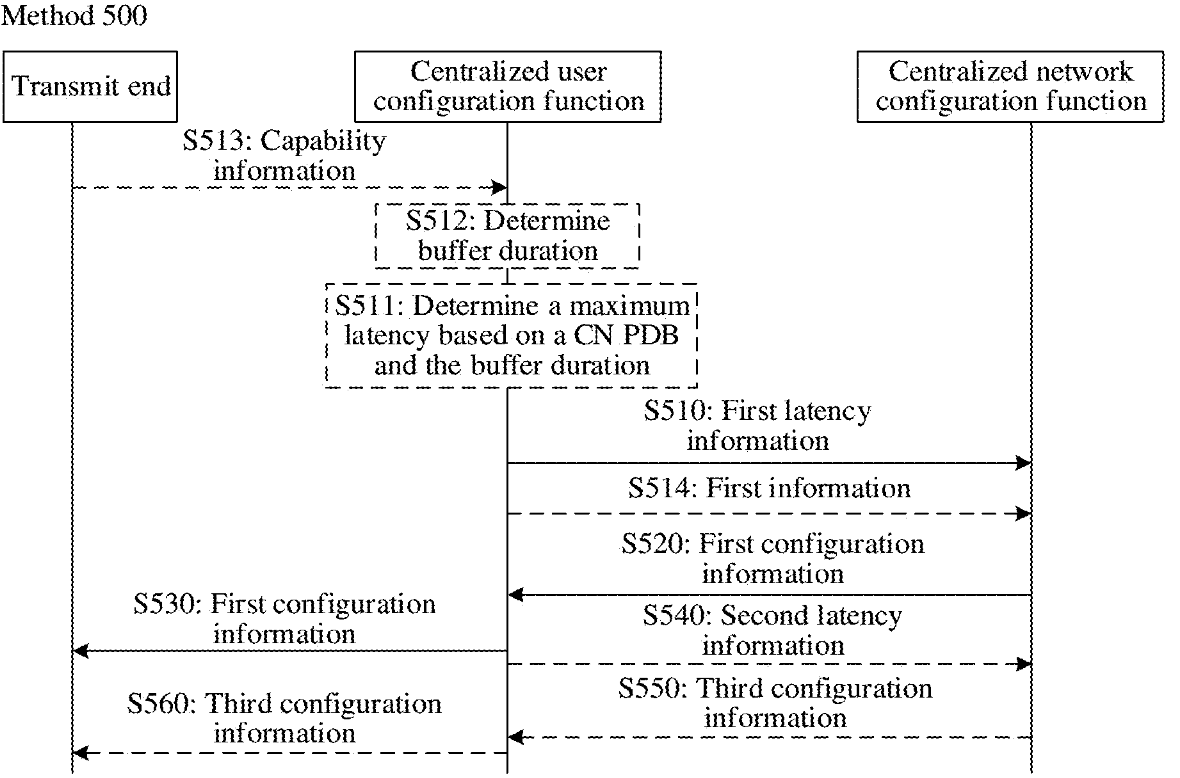
FIG. 5 is a schematic flowchart of a communication method according to this application.

FIG. 5 is a schematic flowchart of a communication method 500 according to an embodiment of this application. The method 500 may include the following steps.

S510: A centralized user configuration function sends first latency information to a centralized network configuration function.

Correspondingly, in S510, the centralized network configuration function receives the first latency information from the centralized user configuration function.

The centralized user configuration function is deployed in a control plane network element in a 5GS, in other words, the centralized user configuration function is collocated with the control plane network element in the 5GS. For example, the centralized user configuration function is deployed in an SMF network element in the 5GS, in other words, the centralized user configuration function is collocated with the SMF network element in the 5GS. The centralized network configuration function belongs to a transport network.

The first latency information indicates an allowed maximum latency (MaxLatency) of a TSN stream. The TSN stream is a TSN stream transmitted between an access network device and a user plane network element, to be specific, the access network device is a transmit end of the TSN stream, and the user plane network element is a receive end of the TSN stream, or the access network device is the receive end of the TSN stream, and the user plane network element is the transmit end of the TSN stream.

The allowed maximum latency of the TSN stream is determined based on a CN PDB and buffer duration, and the allowed maximum latency of the TSN stream does not exceed a difference obtained by subtracting the buffer duration from the CN PDB.

In a possible implementation, the buffer duration is actual buffer duration for buffering a data frame by the transmit end of the TSN stream. The actual buffer duration is duration of a difference between a packet transmission time that is of the transmit end of the TSN stream and that is indicated by the second configuration information and an allowed earliest packet transmission time of the transmit end of the TSN stream.

The second configuration information indicates the packet transmission time of the transmit end of the TSN stream, and the second configuration information is sent by the centralized network configuration function to the centralized user configuration function. For example, in a case in which the data frame in the TSN stream is periodically sent, the packet transmission time indicated by the second configuration information may be represented using a time aware offset (timeawareoffset). The time aware offset refers to an offset of a moment at which the transmit end of the TSN stream sends a first data frame in a transmission periodicity relative to a start moment of the periodicity.

In the case in which the data frame in the TSN stream is periodically sent, the allowed earliest packet transmission time of the transmit end of the TSN stream may be represented using an earliest transmit offset (earliesttransmitoffset). The earliest transmit offset refers to an earliest offset of a moment at which the transmit end of the TSN stream sends the first data frame in the transmission periodicity relative to the start moment of the periodicity.

For example, if the transmit end of the TSN stream is the access network device, the earliest transmit offset may be calculated according to the following formula: earliesttransmitoffset=UL BAT+AN PDB−M×interval, where the UL BAT is uplink (UL) burst arrival time (BAT), to be specific, the UL BAT refers to a time at which an uplink data frame arrives at an egress of the UE, or the UL BAT refers to a time at which the UE sends the uplink data frame to the access network device. M is an integer, and M is a maximum value that can ensure that the following formula is true: (UL BAT+AN PDB)>M×interval, where the interval specifies a period of time in which a traffic specification cannot be exceeded. The traffic specification is defined by a maximum quantity of frames per interval (MaxFramesPerInterval) and a maximum frame size (MaxFrameSize). For example, the interval is maximum duration during which the access network device sends a predefined quantity of frames, and each of the predefined quantity of frames may be a data frame that is of a maximum length can be sent by the access network device. The predefined quantity may be represented using MaxFramesPerInterval, and a size of the data frame that is of the maximum length can be sent by the access network device may be represented using MaxFrameSize.

If the transmit end of the TSN stream is the user plane network element, the earliest transmit offset may be calculated according to the following formula: earliesttransmitoffset=DL BAT+UPF residence duration−M×interval, where the DL BAT is downlink (DL) burst arrival time, to be specific, the DL BAT refers to a time at which a downlink data frame arrives at an ingress of the UPF, or the DL BAT refers to a time at which the UPF receives the downlink data frame. The UPF residence duration refers to duration of a difference between a time at which the user plane network element receives the downlink data frame and a time at which the user plane network element sends the downlink data frame. M is an integer, and M is a maximum value that can ensure that the following formula is true: (DL BAT+UPF residence duration)>M×interval, where the interval specifies a period of time in which a traffic specification cannot be exceeded. The traffic specification is defined by MaxFramesPerInterval and MaxFrameSize. For example, the interval is maximum duration during which the user plane network element sends a predefined quantity of frames, and each of the predefined quantity of frames is a data frame that is of a maximum length can be sent by a user plane.

Optionally, if the transmit end of the TSN stream is the user plane network element, the earliest transmit offset may be calculated according to the following formula: earliesttransmitoffset=DL BAT−M×interval, where M is an integer, and M is a maximum value that can ensure that the following formula is true: DL BAT>M×interval.

For example, in a case in which the buffer duration is the actual buffer duration, if the allowed maximum latency of the TSN stream is equal to the difference obtained by subtracting the buffer duration from the CN PDN, the allowed maximum latency of the TSN stream may be represented as: MaxLatency=CN PDB−(timeawareoffset−earliesttransmitoffset).

Optionally, the allowed maximum latency of the TSN stream may alternatively be less than the difference obtained by subtracting the buffer duration from the CN PDB. For example, the allowed maximum latency of the TSN stream is equal to a difference obtained by subtracting a sum of the buffer duration and preset duration from the CN PDB. In other words, the allowed maximum latency of the TSN stream may be represented as: MaxLatency=CN PDB−(timeawareoffset−earliesttransmitoffset+Δt). Δt represents the preset duration, and the preset duration may be any duration. This is not limited in embodiments of this application. It should be noted that, the preset duration is different from the UPF residence duration.

For another example, if the allowed maximum latency of the TSN stream is equal to a difference obtained by subtracting duration #2 from the CN PDB, the allowed maximum latency of the TSN stream may be represented as: MaxLatency=CN PDB-duration #2, where the duration #2 is equal to the actual buffer duration, or the duration #2 is equal to a sum of the actual buffer duration and the preset duration, or the duration #2 is equal to a sum of the actual buffer duration and the UPF residence duration, or the duration #2 is equal to the interval, that is, the duration #2 is any value as long as the value is not less than a value of the actual buffer duration. This is not limited in embodiments of this application.

In a possible implementation, the buffer duration is maximum possible buffer duration for buffering a data frame by the transmit end of the TSN stream.

For example, the maximum possible buffer duration is duration of a difference between an allowed latest packet transmission time of the transmit end of the TSN stream and the allowed earliest packet transmission time of the transmit end of the TSN stream.

In the case in which the data frame in the TSN stream is periodically sent, the allowed latest packet transmission time of the transmit end of the TSN stream may be represented using a latest transmit offset (latesttransmitoffset). The latest transmit offset refers to a latest offset of the moment at which the transmit end of the TSN stream sends the first data frame in the transmission periodicity relative to the start moment of the periodicity. For example, the latest transmit offset may be calculated according to the following formula: latesttransmitoffset=earliesttransmitoffset+interval-(jitter+duration #1), where the jitter refers to a maximum time difference between an actual packet transmission time of the transmit end of the TSN stream and an ideal synchronization network time, and the duration #1 refers to transmission duration of a data frame between the transmit end of the TSN stream and the receive end of the TSN stream, where the data frame is of a maximum length can be sent by the transmit end of the TSN stream.

In a case in which the buffer duration is the maximum possible buffer duration, if the allowed maximum latency of the TSN stream is equal to the difference obtained by subtracting the buffer duration from the CN PDB, the allowed maximum latency of the TSN stream may be represented as: MaxLatency=CN PDB−(latesttransmitoffset-earliesttransmitoffset).

Optionally, the allowed maximum latency of the TSN stream may alternatively be less than the difference obtained by subtracting the buffer duration from the CN PDB. For example, the allowed maximum latency of the TSN stream is equal to a difference obtained by subtracting a sum of the buffer duration and preset duration from the CN PDB. In other words, the allowed maximum latency of the TSN stream may be represented as: MaxLatency=CN PDB−(latesttransmitoffset-earliesttransmitoffset+Δt).

For another example, if the allowed maximum latency of the TSN stream is equal to a difference obtained by subtracting duration #3 from the CN PDB, the allowed maximum latency of the TSN stream may be represented as: MaxLatency=CN PDB-duration #3, where the duration #3 is equal to the maximum possible buffer duration, or the duration #3 is equal to a sum of the maximum possible buffer duration and the preset duration, or the duration #3 is equal to a sum of the maximum possible buffer duration and the UPF residence duration, or the duration #3 is equal to the interval, or the duration #3 is any value as long as the value is not less than a value of the maximum possible buffer duration. This is not limited in embodiments of this application.

For another example, the maximum possible buffer duration is a smaller one of the following two pieces of duration: duration of a difference between an allowed latest packet transmission time of the transmit end of the TSN stream and the allowed earliest packet transmission time of the transmit end of the TSN stream, and maximum buffer duration supported by the transmit end of the TSN stream.

Optionally, the allowed maximum latency of the TSN stream is determined based on the CN PDB, the buffer duration, and the UPF residence duration, and the allowed maximum duration of the TSN stream does not exceed a difference obtained by subtracting a sum of the buffer duration and the UPF residence duration from the CN PDB. For example, when the UPF residence duration is long, for example, the UPF residence duration is approximate to the CN PDB in terms of an order of magnitude, or the UPF residence duration cannot be ignored in comparison with the CN PDB, the allowed maximum duration of the TSN stream does not exceed the difference obtained by subtracting the sum of the buffer duration and the UPF residence duration from the CN PDB.

For example, if the allowed maximum latency of the TSN stream is equal to the difference obtained by subtracting the sum of the buffer duration and the UPF residence duration from the CN PDB, the allowed maximum latency of the TSN stream may be represented as: MaxLatency=CN PDB−(latesttransmitoffset−earliesttransmitoffset+UPF residence duration), or represented as: MaxLatency=CN PDB−(timeawareoffset−earliesttransmitoffset+UPF residence duration)

For another example, the allowed maximum latency of the TSN stream is less than the difference obtained by subtracting the sum of the buffer duration and the UPF residence duration from the CN PDB. For example, the allowed maximum latency of the TSN stream may be represented as: MaxLatency=CN PDB−(latesttransmitoffset−earliesttransmitoffset+UPF residence duration+Δt), or represented as: MaxLatency=CN PDB−(timeawareoffset−earliesttransmitoffset+UPF residence duration+Δt)

For another example, if the allowed maximum latency of the TSN stream is equal to a difference obtained by subtracting duration #4 from the CN PDB, the allowed maximum latency of the TSN stream may be represented as: MaxLatency=CN PDB−duration #4, where the duration #4 is equal to the sum of the buffer duration and the UPF residence duration, or the duration #4 is equal to a sum of the buffer duration, the UPF residence duration, and the preset duration, or the duration #4 is equal to the interval, that is, the duration #4 is any value as long as the value is not less than a value of the sum of the buffer duration and the UPF residence duration. This is not limited in embodiments of this application.

The first latency information is not limited in embodiments of this application. For example, the first latency information includes the allowed maximum latency of the TSN stream. For another example, the first latency information includes the CN PDB and the buffer duration. For still another example, the first latency information includes the CN PDB, the buffer duration, and the UPF residence duration. For still yet another example, the first latency information includes the CN PDB, the buffer duration, the UPF residence duration, and the preset duration. For still another example, the first latency information includes the CN PDB and the duration #2, or includes the CN PDB and the duration #3, or includes the CN PDB and the duration #4.

In a possible implementation, the first latency information includes the allowed maximum latency of the TSN stream. For example, the maximum latency is preconfigured in the centralized user configuration function. For another example, if the maximum latency is not preconfigured in the centralized user configuration function, before S510, the method 500 further includes S511.

S511: The centralized user configuration function determines the maximum latency based on the CN PDB and the buffer duration.

For example, the centralized user configuration function determines, based on the CN PDB and the buffer duration, that the allowed maximum latency of the TSN stream is equal to the difference obtained by subtracting the buffer duration from the CN PDB. Alternatively, the centralized user configuration function determines, based on the CN PDB and the buffer duration, that the allowed maximum latency of the TSN stream is less than the difference obtained by subtracting the buffer duration from the CN PDB. For example, the centralized user configuration function determines that the maximum latency is equal to the difference obtained by subtracting the sum of the buffer duration and the preset duration from the CN PDB.

For another example, the centralized user configuration function determines, based on the CN PDB, the buffer duration, and the UPF residence duration, that the maximum latency of the TSN stream is equal to the difference obtained by subtracting the sum of the buffer duration and the UPF residence duration from the CN PDB. Alternatively, the centralized user configuration function determines, based on the CN PDB, the buffer duration, and the UPF residence duration, that the allowed maximum latency of the TSN stream is less than the difference obtained by subtracting the sum of the buffer duration and the UPF residence duration from the CN PDB. For example, the centralized user configuration function determines that the maximum latency is equal to the difference obtained by subtracting the sum of the buffer duration and the UPF residence duration, and then subtracting the preset duration from the CN PDB.

For another example, the centralized user configuration function determines, based on the CN PDB and the duration #2, that the allowed maximum latency of the TSN stream is equal to the difference obtained by subtracting the duration #2 from the CN PDB. Alternatively, the centralized user configuration function determines, based on the CN PDB and the duration #3, that the allowed maximum latency of the TSN stream is equal to the difference obtained by subtracting the duration #3 from the CN PDB. Alternatively, the centralized user configuration function determines, based on the CN PDB and the duration #4, that the allowed maximum latency of the TSN stream is equal to the difference obtained by subtracting the duration #4 from the CN PDB.

The buffer duration may be preconfigured in the centralized user configuration function. Alternatively, if the buffer duration is not preconfigured in the centralized user configuration function, before S511, the method 500 further includes S512.

S512: The centralized user configuration function determines the buffer duration.

If the buffer duration is the actual buffer duration, a manner in which the centralized user configuration function determines the buffer duration includes: The centralized user configuration function receives the second configuration information from the centralized network configuration function. The centralized user configuration function determines the actual buffer duration based on the packet transmission time indicated by the second configuration information and the allowed earliest packet transmission time of the transmit end of the TSN stream, that is, determines that the actual buffer duration is duration of a difference between the packet transmission time indicated by the second configuration information and the allowed earliest packet transmission time of the transmit end of the TSN stream.

For example, a flag is stored in the centralized user configuration function, and the flag indicates whether the centralized user configuration function has received the second configuration information. If the flag indicates that the centralized user configuration function has received the second configuration information, the centralized user configuration function may determine the actual buffer duration based on the packet transmission time indicated by the second configuration information and the allowed earliest packet transmission time of the transmit end of the TSN stream. For example, a value of the flag is "o" or "1". When the value of the flag is "1", the flag indicates that the centralized user configuration function has received the second configuration information, and when the value of the flag is "o", the flag indicates that the centralized user configuration function has not received the second configuration information. Alternatively, when the value of the flag is "o", the flag indicates that the centralized user configuration function has received the second configuration information, and when the value of the flag is "1", the flag indicates that the centralized user configuration function has not received the second configuration information.

For another example, the centralized user configuration function maintains a counter corresponding to the TSN stream. After the centralized user configuration function indicates, to the centralized network configuration function, the allowed maximum latency of the TSN stream, a value of the counter is increased by 1. It may be understood that after the centralized user configuration function indicates, to the centralized network configuration function, the allowed maximum latency of the TSN stream, the centralized network configuration function may send the second configuration information to the centralized user configuration function based on the maximum latency of the TSN stream. Further, the centralized user configuration function may determine the actual buffer duration based on the packet transmission time indicated by the second configuration information and the allowed earliest packet transmission time of the transmit end of the TSN stream. In other words, if the value of the counter is greater than an initial value, it indicates that the centralized user configuration function has received the second configuration information, and the centralized user configuration function may determine the actual buffer duration based on the packet transmission time indicated by the second configuration information and the allowed earliest packet transmission time of the transmit end of the TSN stream.

If the buffer duration is the maximum possible buffer duration, a manner in which the centralized user configuration function determines the buffer duration includes: The centralized user configuration function determines the maximum possible buffer duration based on the allowed earliest packet transmission time and the allowed latest packet transmission time that are of the transmit end of the TSN stream, that is, determines that the maximum possible buffer duration is the duration of the difference between the allowed latest packet transmission time and the allowed earliest packet transmission time that are of the transmit end of the TSN stream.

Alternatively, the manner in which the centralized user configuration function determines the buffer duration includes: The centralized user configuration function determines the maximum possible buffer duration based on the maximum buffer duration supported by the transmit end of the TSN. In other words, the centralized user configuration function determines that the maximum possible buffer duration is equal to the maximum buffer duration supported by the transmit end of the TSN.

Alternatively, the manner in which the centralized user configuration function determines the buffer duration includes: The centralized user configuration function determines the maximum possible buffer duration based on the allowed earliest packet transmission time of the transmit end of the TSN, the allowed latest packet transmission time of the transmit end of the TSN, and the maximum buffer duration supported by the transmit end of the TSN. In other words, the centralized user configuration function determines that the maximum possible buffer duration is the smaller one of the following two pieces of duration: the duration of the difference between the allowed latest packet transmission time of the transmit end of the TSN stream and the allowed earliest packet transmission time of the transmit end of the TSN stream, and the maximum buffer duration supported by the transmit end of the TSN stream.

The maximum buffer duration supported by the TSN stream is preconfigured in the centralized user configuration function, or is determined by the centralized user configuration function based on the received capability information, that is, before S512, the method 500 further includes S513.

S513: The transmit end sends the capability information to the centralized user configuration function. Correspondingly, in S513, the centralized user configuration function receives the capability information from the transmit end.

The transmit end is the transmit end of the TSN stream, and the capability information indicates the maximum buffer duration supported by the transmit end of the TSN stream.

For example, in a PDU session establishment procedure, the transmit end of the TSN stream sends (for example, sends through a transparent container) the capability information to the centralized user configuration function.

In a possible implementation, if the first latency information includes the buffer duration, and the buffer duration is not preconfigured in the centralized user configuration function, before S510, the method 500 further includes S512.

Optionally, the method 500 further includes S514.

S514: The centralized user configuration function sends first information to the centralized network configuration function. Correspondingly, in S514, the centralized network configuration function receives the first information from the centralized user configuration function.

The first information indicates the allowed earliest packet transmission time of the transmit end of the TSN stream and the allowed latest packet transmission time of the transmit end of the TSN stream.

For example, duration of a difference between the latest packet transmission time and the earliest packet transmission time that are indicated by the first information does not exceed the maximum buffer duration supported by the transmit end of the TSN stream. To be specific, when determining the allowed earliest packet transmission time of the transmit end of the TSN stream and the allowed latest packet transmission time of the transmit end of the TSN stream, the centralized user configuration function ensures that the duration of the difference between the allowed earliest packet transmission time of the TSN stream and the allowed latest packet transmission time of the transmit end of the TSN stream does not exceed the maximum buffer duration supported by the transmit end of the TSN stream. For example, the centralized user configuration function may determine, according to the following formula, the allowed latest packet transmission time of the transmit end of the TSN stream: Allowed latest packet transmission time of the TSN stream=allowed earliest packet transmission time of the TSN stream+allowed maximum buffer duration of the transmit end of the TSN stream. For another example, the centralized user configuration function may determine, according to the following formula, the allowed latest packet transmission time of the transmit end of the TSN stream: latesttransmitoffset=min {[earliesttransmitoffset+interval−(jitter+duration #1)], [earliesttransmitoffset+maximum buffer duration supported by the transmit end of the TSN stream]}.

The maximum buffer duration supported by the TSN stream is preconfigured in the centralized user configuration function, or is determined by the centralized user configuration function based on the received capability information, that is, before S512, the method 500 further includes S513.

For another example, the latest packet transmission time and the earliest packet transmission time that are indicated by the first information each are the same as the packet transmission time indicated by the second configuration information. To be specific, the centralized user configuration function determines the packet transmission time indicated by the second configuration information as the allowed earliest packet transmission time of the transmit end of the TSN stream and the allowed latest packet transmission time of the transmit end of the TSN stream, and indicates, to the centralized network configuration function based on the first information, the packet transmission time indicated by the second configuration information.

The first latency information and the first information that are sent by the centralized user configuration function may be carried in a same message, or may be carried in different messages. This is not limited in embodiments of this application.

S520: The centralized network configuration function sends first configuration information to the centralized user configuration function.

Correspondingly, in S520, the centralized user configuration function receives the first configuration information from the centralized network configuration function.

The first configuration information indicates a packet transmission time of the transmit end of the TSN stream, and the packet transmission time indicated by the first configuration information is determined based on the allowed maximum latency that is of the TSN stream and that is indicated by the first latency information. It should be noted that, in a case in which the packet transmission time indicated by the first configuration information is determined based on the allowed maximum latency of the TSN stream, when the transmit end of the TSN stream sends a data frame based on the packet transmission time indicated by the first configuration information, transmission duration of the data frame between the transmit end of the TSN stream and the receive end of the TSN stream does not exceed the allowed maximum latency of the TSN stream.

For example, if the first latency information received by the centralized network configuration function includes the allowed maximum latency of the TSN stream, the centralized network configuration function directly determines the first configuration information based on the allowed maximum latency of the TSN stream.

For another example, if the first latency information received by the centralized network configuration function includes the CN PDB and the buffer duration, or includes the CN PDB, the buffer duration, and the UPF residence duration, or includes the CN PDB, the buffer duration, the UPF residence duration, and the preset duration, or includes the CN PDB and the duration #2, or includes the CN PDB and the duration #3, or includes the CN PDB and the duration #4, the centralized network configuration function first determines, based on the first latency information, the allowed maximum latency of the TSN stream, and then determines the first configuration information based on the allowed maximum latency of the TSN stream, or the centralized network configuration function directly determines the first configuration information based on a parameter included in the first latency information.

Optionally, if the centralized network configuration network element receives the first information, the packet transmission time indicated by the first configuration information is determined based on the allowed maximum latency of the TSN stream and the first information. The packet transmission time indicated by the first configuration information is between the allowed earliest packet transmission time of the transmit end of the TSN stream and the allowed latest packet transmission time of the transmit end of the TSN stream.

It may be understood that, if the earliest packet transmission time and the latest packet transmission time that are indicated by the first information each are the same as the packet transmission time indicated by the second configuration information, a packet transmission time determined by the centralized network configuration function based on the first latency information and the first information is the same as the packet transmission time indicated by the second configuration information. Therefore, it can be ensured that both an end-to-end latency between the transmit end and the receive end that are of the TSN stream and an end-to-end latency between a terminal device and the user plane network element are met. In other words, if the earliest packet transmission time and the latest packet transmission time that are indicated by the first information each are the same as the packet transmission time indicated by the second configuration information, it can be avoided that the packet transmission time determined by the centralized network configuration function is different from the packet transmission time indicated by the second configuration information, and therefore, S540 and S550 below do not need to be performed. In a case in which the packet transmission time determined by the centralized network configuration function is different from the packet transmission time indicated by the second configuration information, when the transmit end of the TSN stream sends a data frame based on the packet transmission time determined by the centralized network configuration function, buffer duration of the data frame at the transmit end of the TSN stream may be greater than the actual buffer duration. Consequently, a transmission latency of the data frame between the transmit end and the receive end that are of the TSN stream exceeds the CN PDB, and the end-to-end latency between the terminal device and the user plane network element cannot be met. Therefore, in a case in which the earliest packet transmission time and the latest packet transmission time that are indicated by the first information each are the same as the packet transmission time indicated by the second configuration information, it can be ensured that both the end-to-end latency between the transmit end and the receive end that are of the TSN stream and the end-to-end latency between the terminal device and the user plane network element are met.

S530: The centralized user configuration function sends the first configuration information to the transmit end.

Correspondingly, in S530, the transmit end receives the first configuration information from the centralized user configuration function.

The transmit end is the transmit end of the TSN stream. After receiving the first configuration information, the transmit end determines a packet transmission time based on the first configuration information, and sends a data frame based on the packet transmission time. For example, the packet transmission time determined by the transmit end is the packet transmission time indicated by the first configuration information. For another example, if a first clock on the centralized network configuration function is not synchronized with a second clock on the transmit end of the TSN stream, and a synchronization error between the first clock and the second clock is Δt1, the packet transmission time determined by the transmit end is a time obtained by subtracting Δt1 from the packet transmission time indicated by the first configuration information.

In a possible implementation, in S530, the centralized user configuration function sends fourth configuration information to the transmit end based on the first configuration information, and the fourth configuration information indicates a packet transmission time of the transmit end of the TSN stream.

For example, if the first clock is not synchronized with the second clock, after receiving the first configuration information, the centralized user configuration function determines the fourth configuration information based on the synchronization error Δt between the first clock and the second clock, and sends the fourth configuration information to the transmit end of the TSN stream. For example, if the packet transmission time indicated by the first configuration information is a moment t1, the packet transmission time indicated by the fourth configuration information is a moment (t1−Δt1).

Correspondingly, after receiving the fourth configuration information from the centralized user configuration function, the transmit end sends a data frame based on the packet transmission time indicated by the fourth configuration information.

In embodiments of this application, the centralized user configuration function sends the first latency information to the centralized network configuration function, so that the centralized network configuration function can obtain, based on the first latency information, the allowed maximum latency of the transmit end of the TSN stream. Further, the centralized network configuration function may determine, based on the allowed maximum latency of the transmit end of the TSN stream, a packet transmission time that meets a latency requirement. To be specific, when the transmit end of the TSN stream sends a data frame based on the packet transmission time, a transmission latency of the data frame between the transmit end of the TSN stream and the receive end of the TSN stream does not exceed the allowed maximum latency of the TSN stream.

In addition, the allowed maximum latency that is of the TSN stream and that is indicated by the first latency information does not exceed the difference obtained by subtracting the buffer duration from the CN PDB, so that the end-to-end latency between the terminal device and the user plane network element can also be met. This is because, based on a latency requirement of the allowed maximum latency of the TSN stream, maximum transmission duration of the data frame between the transmit end and the receive end that are of the TSN stream is equal to the allowed maximum latency of the TSN stream. If the transmit end of the TSN stream does not immediately send the data frame but buffers the data frame for a period of time after receiving the data frame, a maximum transmission latency of the data frame between the transmit end and the receive end that are of the TSN stream is equal to a sum of the allowed maximum latency of the TSN stream and the buffer duration. In other words, a transmission latency of the data frame between the transmit end and the receive end that are of the TSN stream does not exceed the CN PDB. In this case, the end-to-end latency between the terminal device and the user plane network element can be met.

Optionally, if the centralized user configuration function receives the second configuration information from the centralized network configuration function before S510, and the packet transmission time indicated by the first configuration information is different from the packet transmission time indicated by the second configuration information, the method 500 may further include S540 to S560. Alternatively, if duration of a difference between the packet transmission time indicated by the first configuration information and the allowed earliest packet transmission time of the transmit end of the TSN stream is greater than duration of a difference between the packet transmission time indicated by the second configuration information and the allowed earliest packet transmission time of the transmit end of the TSN stream, the method 500 may further include S540 to S560.

It should be noted that, in a case in which the packet transmission time indicated by the first configuration information is different from the packet transmission time indicated by the second configuration information, the method 500 may not perform S530.

S540: The centralized user configuration function sends second latency information to the centralized network configuration function.

Correspondingly, in S510, the centralized network configuration function receives the second latency information from the centralized user configuration function.

The second latency information indicates an updated allowed maximum latency of the TSN stream. It may be understood that a maximum latency indicated by the second latency information is different from a maximum latency indicated by the first latency information.

The updated allowed maximum latency of the TSN stream is determined based on the CN PDB and updated actual buffer duration, and the updated maximum latency does not exceed a difference obtained by subtracting the updated actual buffer duration from the CN PDB. The updated actual buffer duration is the duration of the difference between the packet transmission time indicated by the first configuration information and the allowed earliest packet transmission time of the transmit end of the TSN stream.

For example, the updated maximum latency MaxLatency' may be represented as: MaxLatency'=CN PDB−(timeawareoffset'−earliesttransmitoffset), where timeawareoffset' is an example of the packet transmission time indicated by the first configuration information. Alternatively, the updated maximum latency may be represented as: MaxLatency'=CN PDB−(timeawareoffset'−earliesttransmitoffset+Δt). Alternatively, the updated maximum latency may be represented as: MaxLatency'=CN PDB−(timeawareoffset'−earliesttransmitoffset+Δt+UPF residence duration) Alternatively, the updated maximum latency may be represented as: MaxLatency'=CN PDB−duration #5, where duration #5=(timeawareoffset'−earliesttransmitoffset), or duration #5=(timeawareoffset'−earliesttransmitoffset+Δt), or duration #5=(timeawareoffset'−earliesttransmitoffset+Δt+UPF residence duration), or duration #5=interval, that is, the duration #5 is any value as long as the duration #5 is not less than a value of (timeawareoffset'−earliesttransmitoffset).

The second latency information is not limited in embodiments of this application. For example, the second latency information includes the updated maximum latency. For another example, the first latency information includes the CN PDB and the updated actual buffer duration. For still another example, the second latency information includes the CN PDB, the updated actual buffer duration, and the UPF residence duration. For still yet another example, the second latency information includes the CN PDB, the updated actual buffer duration, the UPF residence duration, and the preset duration.

If the second latency information includes the updated maximum latency, before S540, the method 500 further includes: The centralized user configuration function determines the updated maximum latency. For example, the centralized user configuration function determines, based on the CN PDB and the updated actual buffer duration, that the updated maximum latency is equal to the difference obtained by subtracting the updated actual buffer duration from the CN PDB. Alternatively, the centralized user configuration function determines, based on the CN PDB and the updated actual buffer duration, that the updated maximum latency is less than the difference obtained by subtracting the updated actual buffer duration from the CN PDB. For a manner in which the centralized user configuration function determines the updated maximum latency, refer to the foregoing description in S511.

If the second latency information includes the updated actual buffer duration, before S540, the method 500 further includes: The centralized user configuration function determines the updated actual buffer duration. The centralized user configuration function determines the updated actual buffer duration based on the packet transmission time indicated by the first configuration information and the allowed earliest packet transmission time of the transmit end of the TSN stream. For a manner in which the centralized user configuration function determines the updated actual buffer duration, refer to the foregoing description in S512.

S550: The centralized network configuration function sends third configuration information to the centralized user configuration function.

Correspondingly, in S550, the centralized user configuration function receives the third configuration information from the centralized network configuration function.

The third configuration information indicates a packet transmission time of the transmit end of the TSN stream, and the packet transmission time indicated by the third configuration information is determined based on the updated maximum latency indicated by the second latency information.

For S550, refer to the foregoing description in S520. For brevity, details are not described herein again.

S560: The centralized user configuration function sends the third configuration information to the transmit end.

Correspondingly, in S560, the transmit end receives the third configuration information from the centralized user configuration function.

The transmit end is the transmit end of the TSN stream. After receiving the third configuration information, the transmit end determines a packet transmission time based on the third configuration information, and sends a data frame based on the packet transmission time.

Alternatively, in S560, the centralized user configuration function sends fifth configuration information to the transmit end based on the third configuration information, and the fifth configuration information indicates a packet transmission time of the transmit end of the TSN stream. For example, if the first clock is not synchronized with the second clock, after receiving the first configuration information, the centralized user configuration function determines the fourth configuration information based on the synchronization error Δt1 between the first clock and the second clock, and sends the fourth configuration information to the transmit end of the TSN stream.

It should be noted that, if the transmit end receives a plurality of pieces of configuration information, the transmit end determines the packet transmission time based on finally received configuration information. For example, if the transmit end receives the first configuration information and the third configuration information, the transmit end determines the packet transmission time based on the third configuration information.

Optionally, if the packet transmission time indicated by the third configuration information is different from the packet transmission time indicated by the first configuration information, in the method 500, steps similar to S540 and S550 continues to be performed until packet transmission time indicated by two pieces of consecutive configuration information sent by the centralized network configuration function to the centralized user configuration function are the same, or until, in two pieces of consecutive configuration information sent by the centralized network configuration function to the centralized user configuration function, duration of a difference between a packet transmission time indicated by later-sent configuration information and the allowed earliest packet transmission time of the transmit end of the TSN stream is not greater than duration of a difference between a packet transmission time indicated by earlier-sent configuration information and the allowed earliest packet transmission time of the transmit end of the TSN stream.

For example, the allowed earliest packet transmission time of the transmit end of the TSN stream is T1, the packet transmission time indicated by the second configuration information is T2, and the allowed maximum latency of the TSN stream is equal to a difference obtained by subtracting the actual buffer duration from the CN PDB, that is, MaxLatency=CN PDB−(T2−T1), where (T2−T1) is the actual buffer duration. In a case in which the packet transmission time indicated by the first configuration information is T3, when the transmit end of the TSN stream sends a data frame at a moment T3, buffer duration of the data frame at the transmit end of the TSN stream is (T3−T1), and transmission duration of the data frame between the transmit end and the receive end that are of the TSN stream does not exceed the allowed maximum latency of the TSN stream, a maximum transmission latency of the data frame between the transmit end and the receive end that are of the TSN stream may be represented as: Maximum transmission latency=(T3−T1)+CN PDB−(T2−T1). If T3=T2, the maximum transmission latency of the data frame between the transmit end and the receive end that are of the TSN stream is the CN PDB. It can be ensured that the end-to-end latency between the terminal device and the user plane network element is met. If T2 is different from T3, a case in which (T3−T1)>(T2−T1) may occur. In this case, the maximum transmission latency of the data frame between the transmit end and the receive end that are of the TSN stream exceeds the CN PDB, that is, it cannot be ensured that the end-to-end latency between the terminal device and the user plane network element is met.

Therefore, to ensure that the end-to-end latency between the terminal device and the user plane network element is met, when the packet transmission time (T3) indicated by the first configuration information is different from the packet transmission time (T2) indicated by the second configuration information, or the updated actual buffer duration (T3−T1) is greater than the actual buffer duration (T2−T1), the centralized user configuration function determines the updated maximum latency based on (T3−T1). For example, the updated maximum latency is equal to a difference obtained by subtracting (T3−T1) from the CN PDB. In addition, the centralized user configuration function indicates the updated maximum latency to the centralized network configuration function based on the second latency information. Correspondingly, the centralized network configuration function sends the third configuration information to the centralized user configuration function based on the updated maximum latency, and the packet transmission time indicated by the third configuration information is denoted as T4. Similarly, when the transmit end of the TSN stream sends a data frame based on the packet transmission time indicated by the third configuration information, a maximum transmission latency of the data frame between the transmit end and the receive end that are of the TSN stream may be represented as: Maximum transmission latency=(T4−T1)+CN PDB−(T3−T1). If T3=T4, and the maximum transmission latency is equal to the CN PDB, the end-to-end latency between the terminal device and the user plane network element can be met. Certainly, if (T4−T1)< (T3−T1), and the maximum transmission latency is less than the CN PDB, the end-to-end latency between the terminal device and the user plane network element can also be met. To be specific, the packet transmission times indicated by the two pieces of consecutive configuration information (the first configuration information and the third configuration information) sent by the centralized network configuration function to the centralized user configuration function are the same, or duration of a difference between the packet transmission time indicated by the later-sent third configuration information and the allowed earliest packet transmission time of the transmit end of the TSN stream is not greater than duration of a difference between the packet transmission time indicated by the earlier-sent first configuration information and the allowed earliest packet transmission time of the transmit end of the TSN stream, and both the end-to-end latency between the transmit end and the receive end that are of the TSN stream and the end-to-end latency between the terminal device and the user plane network element can be met. Therefore, in the method 500, the steps similar to S540 and S550 may not continue to be performed, to be specific, the centralized user configuration function no longer determines, based on the third configuration information, the allowed maximum latency of the TSN stream. Correspondingly, the centralized network configuration function no longer receives latency information indicating the allowed maximum latency of the TSN stream, and therefore, the centralized network configuration function no longer sends configuration information indicating a packet transmission time to the centralized user configuration function.

Figure 6:
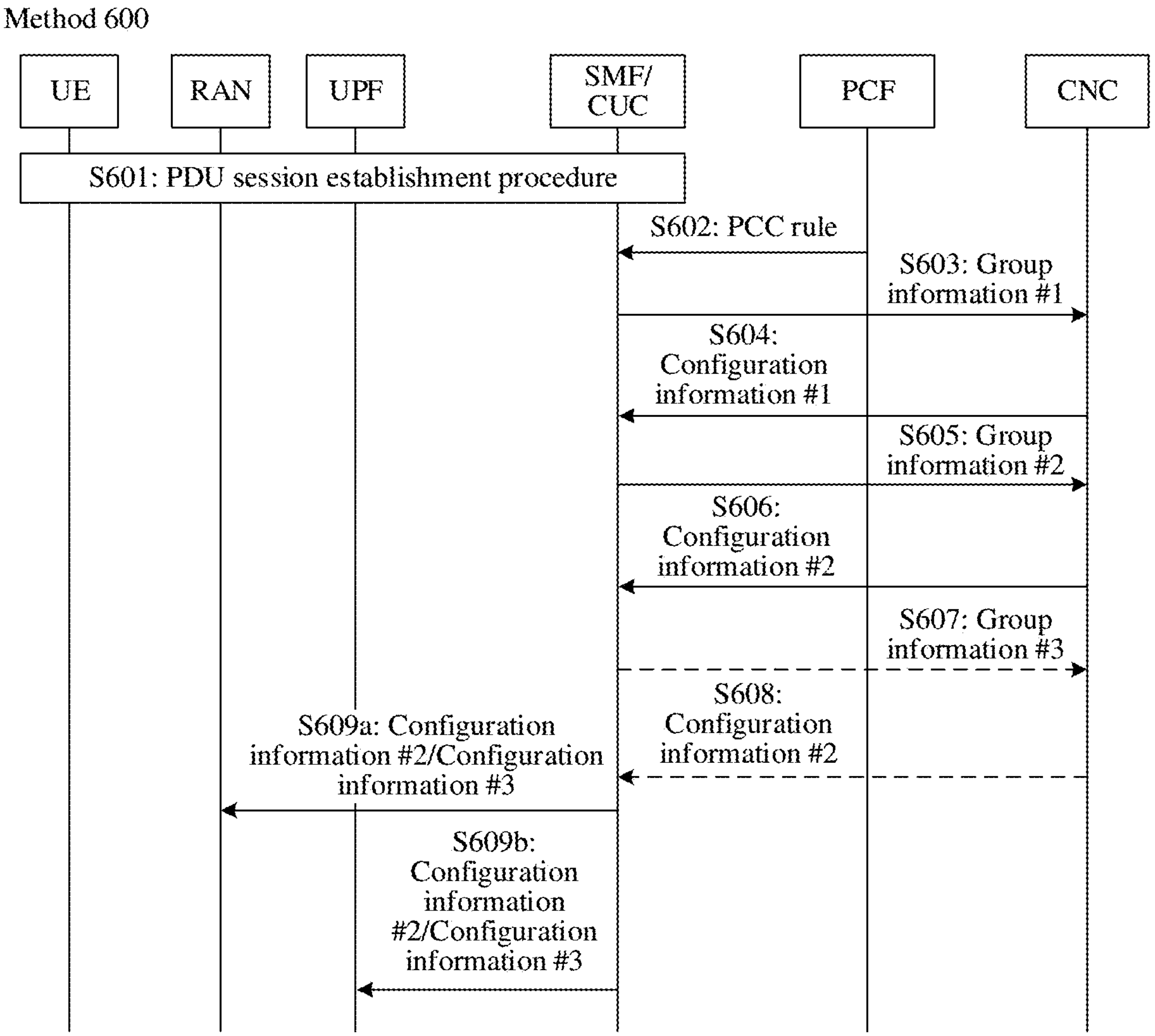
FIG. 6 is a schematic flowchart of a communication method according to this application.
Figure 7:
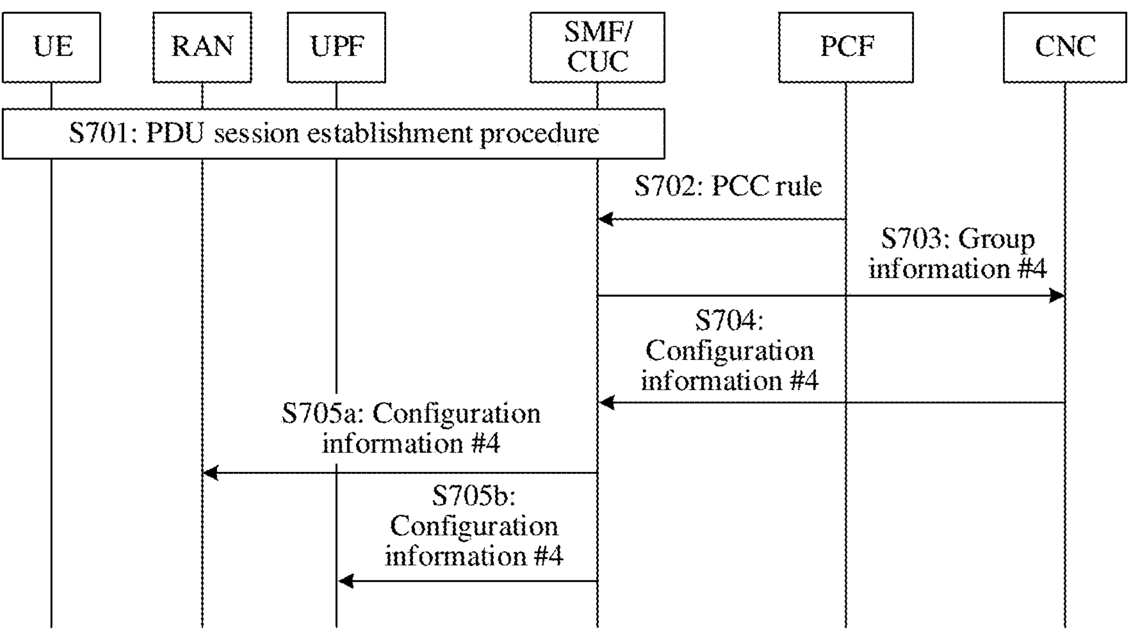
FIG. 7 is a schematic flowchart of a communication method according to this application.

With reference to FIG. 6 or FIG. 7, the following describes a communication method according to an embodiment of this application. It should be noted that, a RAN in FIG. 6 or FIG. 7 is an example of the access network device in FIG. 5, a UPF is an example of the user plane network element in FIG. 5, an/a SMF/CUC is an example of the centralized network configuration function in FIG. 2, the SMF/CUC represents a network element in which the CUC and the SMF are co-deployed, and a CNC is an example of the centralized user configuration function in FIG. 2. In addition, it may be understood that the method described in this application is not only applicable to a 5G communication system. For another type of communication system, reference may also be made to the method in this application. Details are not described in embodiments of this application.

FIG. 6 is a schematic flowchart of a communication method according to an embodiment of this application. The method 600 shown in FIG. 6 may include the following steps.

S601: PDU session establishment procedure

For the PDU session establishment procedure, refer to descriptions in section 4.3.2 in 3GPP TS 23.502. For brevity, details are not described in embodiments of this application.

If the RAN supports a talker/listener (TL) function, in the PDU session establishment procedure, the RAN may report (for example, report through a transparent container) an interface capability to the SMF/CUC. That the RAN supports the TL function means that the RAN may serve as a transmit end or a receive end of a TSN stream.

Similarly, if the UPF supports the TL function, in the PDU session establishment procedure, the UPF may report (for example, report through the transparent container) the interface capability to the SMF/CUC.

The interface capability may include the following three fields: a virtual local area network (VLAN) tag capability (VLANTagCapable), a supported stream identifier type (StreamIdenTypeList), and a supported sequence encode and decode type (SequenceEncode/DecodeTypeList).

Optionally, in the PDU session establishment procedure, the RAN may further report (for example, report through the transparent container) capability information #1 to the SMF/CUC, and the capability information #1 indicates maximum buffer duration supported by the RAN.

Optionally, in the PDU session establishment procedure, the UPF may further report (for example, report through the transparent container) capability information #2 to the SMF/CUC, and the capability information #2 indicates maximum buffer duration supported by the UPF.

S602: A PCF sends a policy and charging control (PCC) rule to the SMF/CUC. Correspondingly, in S602, the SMF/CUC receives the PCC rule from the PCF.

In a QoS flow establishment procedure, the SMF receives the PCC rule from the PCF. The PCC rule includes a time-sensitive communication (TSC) assistance container (TSCAC), and the TSCAC includes one or more of the following parameters: a direction of the TSN stream, a burst size of the TSN stream, a periodicity of the TSN stream, a data volume in the periodicity, and information about a time at which a data frame arrives at a 5GS. In an uplink direction, the information about the time at which the data frame arrives at the 5GS refers to a time at which the data frame arrives at an egress of UE, and the time at which the data frame arrives at the egress of the UE may be denoted as UL BAT. In a downlink manner, the information about the time at which the data frame arrives at the 5GS refers to a time at which the data frame arrives at an ingress of the UPF, and the time at which the data frame arrives at the ingress of the UPF may be denoted as DL BAT.

S603: The SMF/CUC sends group information #1 to the CNC. Correspondingly, in S603, the CNC receives the group information #1 from the SMF/CUC.

The group information #1 includes talker group information #1 and/or listener group information #1. The group information #1 may also be referred to as a merged stream requirement.

The talker group information #1 includes one or more of the following parameters.

(1) Stream identifier (streamID): The stream identifier identifies a stream configuration. The stream identifier may include the following two fields: a medium access control (MAC) address (MACAddress) and a unique identifier (UniqueID). The MAC address is a source MAC address initiated by a stream, and the unique identifier is used for distinguishing different streams at a same transmit end. The stream identifier is generated by the SMF/CUC based on preconfigured information.

(2) Stream rank: The stream rank is used for providing a rank of a stream relative to other streams in a network. The rank herein is used for determining a priority of a stream resource configuration, and is irrelevant to data of the stream. The stream rank is generated by the SMF/CUC based on preconfigured information.

(3) End station interface: The end station interface is used for describing an interface corresponding to a stream. The end station interface may include the following two fields: a MAC address and an interface name. One stream may include one or more interfaces. The end station interface is preconfigured in the SMF/CUC. Alternatively, in the PDU session establishment procedure, the RAN and/or the UPF report/reports (for example, report/reports through the transparent container) the end station interface to the SMF/CUC.

(4) Traffic specification: The traffic specification is used for defining how a transmit end sends a data frame. The traffic specification may include one or more of the following configurations: an interval, a maximum quantity of frames per interval (MaxFramesPerInterval), a maximum frame size (MaxFrameSize), transmission selection (Transmission Selection), an allowed earliest packet transmission time #1 of the transmit end of the TSN stream, an allowed latest packet transmission time #1 of the transmit end of the TSN stream, or jitter.

Interval: The interval is maximum duration for sending a defined maximum frame size and a defined maximum quantity of frames per interval. The SMF/CUC may determine the interval based on a periodicity of the TSN stream included in the TSCAC.

Maximum quantity of frames per interval: The maximum frame per interval is used for specifying a maximum quantity of frames sent in one periodicity.

Maximum frame size: The maximum frame size is a maximum frame size that can be sent by the transmit end.

Transmission selection: The transmission selection is a scheduling algorithm used during stream forwarding.

The allowed earliest packet transmission time #1 of the transmit end of the TSN stream may be represented using an earliest transmit offset #1. For the uplink direction, the earliest transmit offset #1 may be calculated according to the following formula: earliesttransmitoffset #1=UL BAT+AN PDB−M×interval. For the downlink direction, the earliest transmit offset #1 may be calculated according to the following formula: earliesttransmitoffset #1=DL BAT+UPF residence duration−M×interval. After receiving the TCSAC, the SMF/CUC may calculate the earliest transmit offset #1 based on the information about the time at which the data frame arrives at the 5GC and a PDB (including the AN PDB and the CN PDB) corresponding to the QoS flow that are included in the TSCAC.

The allowed latest packet transmission time #1 of the transmit end of the TSN stream may be represented using a latest transmit offset #1, and the latest transmit offset #1 may be calculated according to the following formula:

latesttransmitoffset #1=earliesttransmitoffset #1+interval−(jitter+duration #1)

Optionally, if the TSN stream is in the uplink direction, and in S601, the SMF/CUC receives the capability information #1 from the RAN, when determining the latest packet transmission time #1, the SMF/CUC ensures that duration of a difference between the latest packet transmission time #1 and the earliest packet transmission time #1 does not exceed the maximum buffer duration supported by the RAN. In this case, the latest transmit offset #1 may be calculated according to the following formula:

latesttransmitoffset #1=earliesttransmitoffset #1+maximum transmission duration supported by the RAN.

Optionally, if the TSN stream is in the downlink direction, and in S601, the SMF/CUC receives the capability information #2 from the UPF, when determining the latest packet transmission time #1, the SMF/CUC ensures that duration of a difference between the latest packet transmission time #1 and the earliest packet transmission time #1 does not exceed the maximum buffer duration supported by the UPF. In this case, the latest transmit offset #1 may be calculated according to the following formula:

latesttransmitoffset #1=earliesttransmitoffset #1+maximum transmission duration supported by the UPF.

Jitter: The jitter is a maximum time difference between a transmit offset of the transmit end and an ideal synchronization network time point. The SMF/CUC may generate the jitter based on local configuration information.

(5) User to network requirement: The user to network requirement is used for defining a user requirement, such as a requirement on a latency or a requirement on redundancy. The user to network requirement may include a quantity of seamless connection trees (NumSeamlessTrees) and an allowed maximum latency #1 of the TSN stream.

Quantity of seamless connection trees: The quantity of seamless connection trees is a quantity of redundant paths that the network is required to provide for seamless connection.

Maximum latency #1: The maximum latency is a maximum latency of a data frame from the transmit end to the receive end. The SMF/CUC may determine the maximum latency #1 based on the CN PDB corresponding to the QoS flow, in other words, the SMF/CUC may determine that the maximum latency #1 is equal to the CN PDB. Alternatively, the SMF/CUC may determine the maximum latency #1 based on the CN PDB and the UPF residence duration, in other words, the SMF/CUC may determine that the maximum latency #1 is equal to a difference obtained by subtracting the UPF residence duration from the CN PDB.

(6) Interface capability: The interface capability is preconfigured in the SMF/CUC. Alternatively, in the PDU session establishment procedure, the RAN and/or the UPF report/reports the interface capability to the SMF/CUC.

The listener group information #1 includes one or more of the following parameters: a stream identifier, an end station interface, a user to network requirement, or an interface capability. A definition of each parameter and a manner of determining each parameter are the same as those of the talker group information #1, and details are not described again.

It may be understood that in a case in which the group information #1 includes the earliest packet transmission time #1 and the latest packet transmission time #1, the group information #1 is an example of the first information.

Optionally, if the SMF/CUC maintains a counter corresponding to the TSN stream, after the SMF/CUC sends the group information #1 to the CNC, a value of the counter is increased by 1.

S604: The CNC sends configuration information #1 to the SMF/CUC. Correspondingly, the SMF/CUC receives the configuration information #1 from the CNC.

The configuration information #1 (an example of the second configuration information) may also be referred to as status group information. The configuration information #1 is determined by the CNC based on the received group information #1.

The configuration information #1 includes one or more of the following parameters: a stream identifier, status information, an accumulated latency (Accumulated Latency), an interface configuration, or a failed interface.

(1) Stream identifier: A definition of the stream identifier is the same as that of the stream identifier in the talker group information #1.

(2) Status information: The status information indicates a status of a configuration of the TSN stream. The status information may include at least one of the following configurations: a status of the transmit end (TalkerStatus), a status of the receive end (ListenerStatus), or failure code (FailureCode)

(3) Accumulated latency: The accumulated latency is a possible maximum latency of a transmission path that is currently planned.

(4) Interface configuration: The interface configuration is an interface configuration of the transmit end and the receive end, and the configuration meets a requirement of a stream and a requirement of an interface capability. The interface configuration includes the packet transmission time #1 of the transmit end of the TSN stream, and the packet transmission time #1 may be represented using a time aware offset #1. The CNC may determine the packet transmission time #1 based on the following information included in the group information #1: the earliest packet transmission time #1, the latest packet transmission time #1, and the maximum latency #1. The packet transmission time #1 determined by the CNC based on the group information #1 is between the earliest packet transmission time #1 and the latest packet transmission time #1. For example, if the earliest transmit offset #1, the latest transmit offset #1, and the time aware offset #1 are used for representing the earliest packet transmission time #1, the latest packet transmission time #1, and the packet transmission time #1 respectively, the time aware offset #1 is between the earliest transmit offset #1 and the latest transmit offset #1.

(5) Failed interface: The failed interface is a list of interfaces that fail to be configured.

Optionally, the SMF/CUC stores a flag. After the SMF/CUC receives the configuration information #1, the flag is set to a value indicating that the configuration information #1 has been received.

S605: The SMF/CUC sends group information #2 to the CNC. Correspondingly, in S605, the CNC receives the group information #2 from the SMF/CUC.

For the group information #2 (an example of the first latency information), refer to the related description of the group information #1. A difference between the group information # 2 and the group information #1 lies in that an allowed maximum latency #2 that is of the TSN stream and that is included in the group information #2 is different from the maximum latency #1 included in the group information #1, and the maximum latency #2 included in the group information #2 is determined by the SMF/CUC based on the configuration information #1.

After receiving the configuration information #1, the SMF/CUC determines a packet transmission time #1 indicated by the configuration information #1. Further, the SMF/CUC determines actual buffer duration #1 based on the packet transmission time #1 and the earliest packet transmission time #1, and determines the maximum latency #2 based on the CN PDB and the actual buffer duration #1. For more descriptions of determining the actual buffer duration #1 and the maximum latency #2 by the SMF/CUC, refer to S512 and S511 in the method 500.

Optionally, if the SMF/CUC maintains a counter corresponding to the TSN stream, in a case in which a value of the counter is greater than an initial value, the SMF/CUC determines the maximum latency #2 based on the packet transmission time #1 indicated by the configuration information #1.

Optionally, if the SMF/CUC stores a flag, in a case in which the flag indicates that the configuration information #1 has been received, the SMF/CUC determines the maximum latency #2 based on the packet transmission time #1 indicated by the configuration information #1.

Optionally, the difference between the group information #2 and the group information #1 further lies in that an allowed earliest packet transmission time #2 that is of the transmit end of the TSN stream and that is included in the group information #2 is different from the earliest packet transmission time #1, and an allowed latest packet transmission time #2 that is of the transmit end of the TSN stream and that is included in the group information # 2 is different from the latest packet transmission time #1. Both the earliest packet transmission time #2 and the latest packet transmission time #2 that are included in the group information #2 each are the same as the packet transmission time #1 indicated by the configuration information #1.

For example, the configuration information #1 includes the time aware offset #1, the earliest packet transmission time #2 is represented using an earliest transmit offset #2, and the latest packet transmission time #2 is represented using a latest transmit offset #2. In this case, the group information #2 may include the earliest transmit offset #2 and the latest transmit offset #2, and both the earliest transmit offset #2 and the latest transmit offset #2 each are the same as the time aware offset #1.

S606: The CNC sends configuration information #2 to the SMF/CUC. Correspondingly, the SMF/CUC receives the configuration information #2 from the CNC.

For the configuration information #2 (an example of the first configuration information), refer to the related description of the configuration information #1.

The configuration information #2 includes a packet transmission time #2 of the transmit end of the TSN stream, and the packet transmission time #2 may be represented using a time aware offset #2. The CNC determines the packet transmission time #2 based on the following information included in the group information #2: the earliest packet transmission time #2, the latest packet transmission time #2, and the maximum latency #2. The packet transmission time #2 determined by the CNC based on the group information #2 is between the earliest packet transmission time #2 and the latest packet transmission time #2.

It may be understood that if both the earliest packet transmission time #2 and the latest packet transmission time #2 that are included in the group information #2 each are the same as the packet transmission time #1 indicated by the configuration information #1, the packet transmission time #2 determined by the CNC based on the group information #2 is the same as the packet transmission time #1. Otherwise, because the maximum latency #2 included in the group information #2 is different from the maximum latency #1 included in the group information #1, the packet transmission time #2 determined by the CNC based on the group information #2 may be different from the packet transmission time #1.

Optionally, if the packet transmission time #2 is different from the packet transmission time #1, the method 600 further includes S607 and S608. Alternatively, if the packet transmission time #2 is different from the packet transmission time #1, and duration of a difference between the packet transmission time #2 and the earliest packet transmission time #2 is greater than duration of a difference between the packet transmission time #1 and the earliest packet transmission time #1, the method 600 further includes S607 and S608.

S607: The SMF/CUC sends group information #3 to the CNC. Correspondingly, in S607, the CNC receives the group information #3 from the SMF/CUC.

For the group information #3 (an example of the second latency information), refer to the related description of the group information #1. A difference between the group information #3 and the group information #2 lies in that an allowed maximum latency #3 that is of the TSN stream and that is included in the group information #3 is different from the maximum latency #2 included in the group information #2, and the maximum latency #3 included in the group information #3 is determined by the SMF/CUC based on the configuration information #2.

After receiving the configuration information #2, the SMF/CUC determines a packet transmission time #2 indicated by the configuration information #2. Further, the SMF/CUC determines actual buffer duration #2 (that is, updated actual buffer duration) based on the packet transmission time #2 and the earliest packet transmission time #2, and determines a maximum latency #3 based on the CN PDB and the actual buffer duration #2. For more descriptions of determining the actual buffer duration #2 and the maximum latency #3 by the SMF/CUC, refer to S512 and S511 in the method 500.

Optionally, the difference between the group information #3 and the group information #2 further lies in that an allowed earliest packet transmission time #3 that is of the transmit end of the TSN stream and that is included in the group information #3 is different from the earliest packet transmission time #2, and an allowed latest packet transmission time #3 that is of the transmit end of the TSN stream and that is included in the group information #3 is different from the latest packet transmission time #2. Both the earliest packet transmission time #3 and the latest packet transmission time #3 that are included in the group information #3 each are the same as the packet transmission time #2 indicated by the configuration information #2.

S608: The CNC sends configuration information #3 to the SMF/CUC. Correspondingly, the SMF/CUC receives the configuration information #3 from the CNC.

For the configuration information #3 (an example of the third configuration information), refer to the related description of the configuration information #1.

The configuration information #3 includes a packet transmission time #3 of the transmit end of the TSN stream, and the packet transmission time #3 may be represented using a time aware offset #3. The CNC determines the packet transmission time #3 based on the following information included in the group information #3: the earliest packet transmission time #3, the latest packet transmission time #3, and the maximum latency #3. The packet transmission time #3 determined by the CNC based on the group information #3 is between the earliest packet transmission time #3 and the latest packet transmission time #3.

If the packet transmission time #3 is different from the packet transmission time #2, in the method 600, steps similar to S607 and S608 continues to be performed until packet transmission times indicated by two pieces of consecutive configuration information sent by the CNC to the SMF/CUC are the same.

Further, in the method 600, S609*a* or S609*b* is performed. If the RAN is the transmit end of the TSN stream, S609*a* is performed in the method 600. If the UPF is the transmit end of the TSN stream, S609*b* is performed in the method 600.

S609*a*: The SMF/CUC sends the configuration information #2 or the configuration information #3 to the RAN. Correspondingly, in S609*a*, the RAN receives the configuration information #2 or the configuration information #3 from the SMF/CUC.

If S607 and S608 are not performed in the method 600, the SMF/CUC sends the configuration information #2 to the RAN. If S607 and S608 are performed in the method 600, the SMF/CUC sends the configuration information #3 to the RAN. After receiving the configuration information #2 or the configuration information #3, the RAN sends a data frame based on the packet transmission time indicated by the configuration information #2 or the configuration information #3.

S609*b*: The SMF/CUC sends the configuration information #2 or the configuration information #3 to the UPF. Correspondingly, in S609*a*, the UPF receives the configuration information #2 or the configuration information #3 from the SMF/CUC.

If S607 and S608 are not performed in the method 600, the SMF/CUC sends the configuration information #2 to the UPF. If S607 and S608 are performed in the method 600, the SMF/CUC sends the configuration information #3 to the UPF. After receiving the configuration information #2 or the configuration information #3, the UPF sends a data frame based on the packet transmission time indicated by the configuration information #2 or the configuration information #3.

In embodiments of this application, after receiving configuration information, the SMF/CUC may determine actual buffer duration based on a packet transmission time indicated by the configuration information and an allowed earliest packet transmission time of the transmit end of the TSN stream, so that the SMF/CUC can re-determine a more appropriate maximum latency based on the actual buffer duration, and both a latency between the transmit end and the receive end that are of the TSN stream and an end-to-end latency between the UE and the UPF are met.

In addition, in a case in which the SMF/CUC determines the maximum latency based on the actual buffer duration, the SMF/CUC does not determine an excessively small maximum latency, to avoid a case in which a capability of a transport network is insufficient to meet the maximum latency.

FIG. 7 is a schematic flowchart of a communication method according to an embodiment of this application. The method 700 shown in FIG. 7 may include the following steps.

S701: PDU session establishment procedure

S702: A PCF sends a PCC rule to an/a SMF/CUC. Correspondingly, in S702, the SMF/CUC receives the PCC rule from the PCF.

For S701 and S702, refer to S601 and S602 in the foregoing method 600.

S703: The SMF/CUC sends group information #4 to a CNC. Correspondingly, in S703, the CNC receives the group information #4 from the SMF/CUC.

For the group information #4 (an example of the first latency information), refer to the related description of the group information #1 in S603. A difference between the group information #4 and the group information #1 lies in that an allowed maximum latency #4 that is of a TSN stream and that is included in the group information #4 is different from a maximum latency #1 included in the group information #1, and the maximum latency #4 included in the group information #4 is determined by the SMF/CUC based on a CN PDB and maximum possible buffer duration. For more descriptions of determining the maximum possible buffer duration by the SMF/CUC and determining the maximum latency #4 based on the maximum possible buffer duration and the CN PDB, refer to S511 and S512 in the foregoing method 500.

S704: The CNC sends configuration information #4 to the SMF/CUC. Correspondingly, in S704, the SMF/CUC receives the configuration information #4 from the CNC.

For the configuration information #4 (an example of the first configuration information), refer to the related description of the configuration information #1 in S604.

The configuration information #4 includes a packet transmission time #4 of a transmit end of the TSN stream, and the packet transmission time #4 may be represented using a time aware offset #4. The CNC determines the packet transmission time #4 based on the following information included in the group information #4: an earliest packet transmission time #4, a latest packet transmission time #4, and the maximum latency #4. The packet transmission time #4 determined by the CNC based on the group information #4 is between the earliest packet transmission time #4 and the latest packet transmission time #4. The latest packet transmission time #4 is the same as the latest packet transmission time #1 in S603, and the earliest packet transmission time #4 is the same as the earliest packet transmission time #1 in S603.

Further, in the method 700, S705*a* or S705*b* is performed. If a RAN is the transmit end of the TSN stream, S705*a* is performed in the method 700. If a UPF is the transmit end of the TSN stream, S705*b* is performed in the method 700.

S705*a*: The SMF/CUC sends the configuration information #4 to the RAN. Correspondingly, in S705*a*, the RAN receives the configuration information #4 from the SMF/CUC.

After receiving the configuration information #4, the RAN sends a data frame based on the packet transmission time indicated by the configuration information #4.

S705*b*: The SMF/CUC sends the configuration information #4 to the UPF. Correspondingly, in S705*a*, the UPF receives the configuration information #4 from the SMF/CUC.

After receiving the configuration information #4, the UPF sends a data frame based on the packet transmission time indicated by the configuration information #4.

In embodiments of this application, the SMF/CUC determines a maximum latency based on maximum possible buffer duration for buffering a data frame by the transmit end of the TSN stream, so that when the CNC determines a packet transmission time of the transmit end of the TSN stream based on the maximum latency, regardless of a value of the packet transmission time determined by the CNC, a latency between the transmit end and a receive end that are of the TSN stream and an end-to-end latency between UE and the UPF can be met.

The methods provided in embodiments of this application are described above in detail with reference to FIG. 5 to FIG. 7. The following describes in detail communication apparatuses provided in embodiments of this application with reference to FIG. 8 to FIG. 10. It should be understood that descriptions of apparatus embodiments correspond to the descriptions of the method embodiments. Therefore, for content that is not described in detail, refer to the foregoing method embodiments. For brevity, details are not described herein again.

Figure 8:
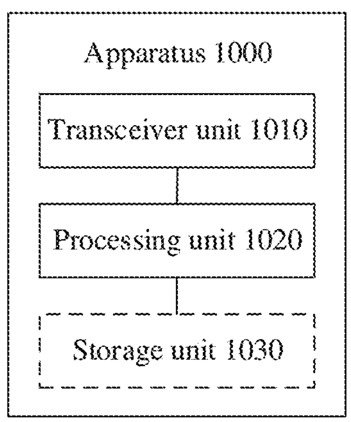
FIG. 8 is a schematic diagram of a communication apparatus according to an embodiment of this application.

FIG. 8 is a schematic block diagram of a communication apparatus 1000 according to an embodiment of this application. As shown in FIG. 8, the communication apparatus 1000 may include: a transceiver unit 1010 and a processing unit 1020.

In a possible design, the communication apparatus 1000 may be the centralized user configuration function in the foregoing method embodiments, or may be a chip that implements functions of the centralized user configuration function in the foregoing method embodiments.

It should be understood that the communication apparatus 1000 may correspond to the centralized user configuration function in the method 400 in embodiments of this application. The communication apparatus 1000 may include units configured to perform the method performed by the centralized user configuration function in the method 500 in FIG. 5, the method 600 in FIG. 6, or the method 700 in FIG. 7. In addition, the units in the communication apparatus 1000 and the foregoing other operations and/or functions are respectively intended to implement corresponding procedures of the method 500 in FIG. 5, the method 600 in FIG. 6, or the method 700 in FIG. 7. It should be understood that a specific process in which the unit performs the foregoing corresponding step is described in detail in the foregoing method embodiments. For brevity, details are not described herein.

Figure 9:
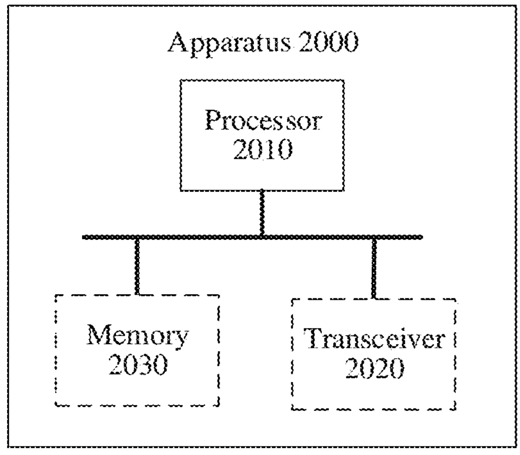
FIG. 9 is a schematic block diagram of a communication apparatus according to another embodiment of this application.
Figure 10:
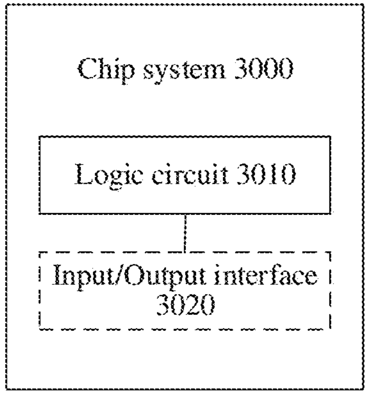
FIG. 10 is a schematic diagram of a chip system according to an embodiment of this application.

It should be understood that the transceiver unit 1010 in the communication apparatus 1000 may correspond to a transceiver 2020 in a communication device 2000 shown in FIG. 9, and the processing unit 1020 in the communication apparatus 1000 may correspond to a processor 2010 in the communication device 2000 shown in FIG. 9.

It should be further understood that when the communication apparatus 1000 is the chip, the chip includes a transceiver unit. Optionally, the chip may further include a processing unit. The transceiver unit may be an input/output circuit or a communication interface. The processing unit may be a processor, a microprocessor, or an integrated circuit integrated on the chip.

The transceiver unit 1010 is configured to implement an operation of receiving and sending a signal of the communication apparatus 1000, and the processing unit 1020 is configured to implement an operation of processing a signal of the communication apparatus 1000.

Optionally, the communication apparatus 1000 further includes a storage unit 1030, and the storage unit 1030 is configured to store instructions.

FIG. 9 is a schematic block diagram of an apparatus 2000 according to an embodiment of this application. As shown in FIG. 9, the apparatus 2000 includes: at least one processor 2010. The processor 2010 is coupled to a memory, and is configured to execute instructions stored in the memory, to perform the method in FIG. 5, FIG. 6, or FIG. 7. Optionally, the apparatus 2000 further includes a transceiver 2020. The processor 2010 is coupled to the memory, and is configured to execute the instructions stored in the memory, to control the transceiver 2020 to send a signal and/or receive a signal. For example, the processor 2010 may control the transceiver 2020 to send first latency information. Optionally, the apparatus 2000 further includes a memory 2030, and the memory 2030 is configured to store instructions.

It should be understood that the processor 2020 and the memory 2030 may be integrated into one processing apparatus. The processor 2020 is configured to execute program code stored in the memory 2030 to implement the foregoing functions. During specific implementation, the memory 2030 may alternatively be integrated into the processor 2010, or may be independent of the processor 2010.

It should be further understood that the transceiver 2020 may include a receiver (or referred to as a receive machine) and a transmitter (or referred to as a transmit machine). The transceiver 2020 may further include an antenna, and there may be one or more antennas. The transceiver 2020 may alternatively be a communication interface or an interface circuit.

When the apparatus 2000 is a chip, the chip includes a transceiver unit and a processing unit. The transceiver unit may be an input/output circuit or a communication interface. The processing unit may be a processor, a microprocessor, or an integrated circuit integrated on the chip.

FIG. 9 is a schematic diagram of a chip system according to an embodiment of this application. The chip system herein may alternatively be a system including circuits. The chip system 3000 shown in FIG. 9 includes: a logic circuit 3010 and an input/output interface (input/output interface) 3020. The logic circuit is configured to be coupled to an input interface, and perform data (for example, configuration information) transmission through the input/output interface, to perform the method in FIG. 5, FIG. 6, or FIG. 7.

An embodiment of this application further provides a processing apparatus, including a processor and an interface. The processor may be configured to perform the method in the foregoing method embodiments.

It should be understood that the processing apparatus may be a chip. For example, the processing apparatus may be a field programmable gate array (FPGA), an application-specific integrated chip (ASIC), a system on chip (SoC), a central processing unit (central processing unit, CPU), a network processor (NP), a digital signal processor (DSP), a micro controller unit (MCU), a programmable logic device (PLD), or another integrated chip.

During implementation, steps in the foregoing method may be completed using an integrated logic circuit of hardware in the processor, or using instructions in a form of software. The steps of the method disclosed with reference to embodiments of this application may be directly performed by a hardware processor, or may be performed using a combination of the hardware in the processor and a software module. The software module may be located in a storage medium, such as a random register, a flash memory, a read-only memory, a programmable read-only memory, an electrically erasable programmable memory, or a register that is mature in the art. The storage medium is located in a memory, and the processor reads information in the memory and completes the steps in the foregoing method with reference to the hardware of the processor. To avoid repetition, details are not described herein again.

It should be noted that, the processor in embodiments of this application may be an integrated circuit chip, and has a signal processing capability. During implementation, steps in the foregoing method embodiments may be implemented using the integrated logic circuit of the hardware in the processor, or using the instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logic block diagrams that are disclosed in embodiments of this application. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache.

According to the methods provided in embodiments of this application, this application further provides a computer program product. The computer program product includes computer program code. When the computer program code is run on a computer, the computer is enabled to perform the method in the embodiments shown in FIG. 5, FIG. 6, or FIG. 7.

According to the methods provided in embodiments of this application, this application further provides a computer-readable medium. The computer-readable medium stores program code. When the program code is run on a computer, the computer is enabled to perform the method in the embodiments shown in FIG. 5, FIG. 6, or FIG. 7.

According to the methods provided in embodiments of this application, this application further provides a system. The system includes the foregoing centralized user configuration function and the foregoing centralized network configuration function.

A part or all of the foregoing embodiments may be implemented by software, hardware, firmware, or any combination thereof. When the software is used for implementation, the part or all of the foregoing embodiments may be implemented in a form of a computer program product. The computer program product includes one or more computer instructions. When the computer instructions are loaded and executed on a computer, procedures or functions according to embodiments of this application are all or partially generated. The computer instructions may be stored in a computer-readable storage medium, or may be transmitted from one computer-readable information medium to another computer-readable storage medium. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a digital versatile disc (DVD)), a semiconductor medium (for example, a solid-state disc (SSD)), or the like.

In the several embodiments provided in this application, it should be understood that the disclosed system, apparatus, and method may be implemented in other manners. For example, the described apparatus embodiments are merely examples. For example, division into the units is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or the communication connections between the apparatuses or units may be implemented in electrical, mechanical, or another form.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

determining, by a centralized user configuration function based on a core network packet delay budget (CN PDB) and a buffer duration, an allowed maximum latency of a time-sensitive network (TSN) stream transmitted between an access network device and a user plane network element, wherein the maximum latency does not exceed a difference obtained by subtracting the buffer duration from the CN PDB, and wherein the access network device is a transmit end of the TSN stream and the user plane network element is a receive end of the TSN stream, or the access network device is a receive end of the TSN stream and the user plane network element is a transmit end of the TSN stream;

sending, by the centralized user configuration function, first latency information to a centralized network configuration function, wherein the first latency information indicates the maximum latency;

receiving, by the centralized user configuration function, first configuration information from the centralized network configuration function, wherein the first configuration information indicates a packet transmission time of the transmit end of the TSN stream, and wherein the packet transmission time indicated by the first configuration information is associated with the maximum latency; and sending, by the centralized user configuration function, the first configuration information to the transmit end of the TSN stream.

2. The method according to claim 1, further comprising:

determining, by the centralized user configuration function, the buffer duration, wherein the buffer duration comprises an actual buffer duration for buffering a data frame by the transmit end of the TSN stream, or a maximum possible buffer duration for buffering a data frame by the transmit end of the TSN stream.

3. The method according to claim 2, wherein the buffer duration comprises the maximum possible buffer duration; and wherein the determining, by the centralized user configuration function, the buffer duration comprises:

determining, by the centralized user configuration function, that the maximum possible buffer duration is a difference between an allowed latest packet transmission time of the transmit end of the TSN stream and an allowed earliest packet transmission time of the transmit end of the TSN stream.

4. The method according to claim 2, wherein the buffer duration comprises the maximum possible buffer duration; and wherein the determining the buffer duration comprises:

determining, by the centralized user configuration function, that the maximum possible buffer duration is a smaller one of a duration of a difference between an allowed latest packet transmission time of the transmit end of the TSN stream and an allowed earliest packet transmission time of the transmit end of the TSN stream, and a maximum buffer duration supported by the transmit end of the TSN stream.

5. The method according to claim 2, wherein the buffer duration comprises the actual buffer duration; and wherein the method further comprises:

receiving, by the centralized user configuration function, second configuration information from the centralized network configuration function, wherein the second configuration information indicates a packet transmission time of the transmit end of the TSN stream; and wherein the determining the buffer duration comprises:

determining, by the centralized user configuration function, that the actual buffer duration is a difference between the packet transmission time indicated by the second configuration information and an allowed earliest packet transmission time of the transmit end of the TSN stream.

6. The method according to claim 5, wherein if the packet transmission time indicated by the first configuration information is different from the packet transmission time indicated by the second configuration information, the method further comprises:

determining, by the centralized user configuration function based on the CN PDB and an updated actual buffer duration, an updated allowed maximum latency of the TSN stream, wherein the updated maximum latency does not exceed a difference obtained by subtracting the updated actual buffer duration from the CN PDB, and wherein the updated actual buffer duration is a duration of a difference between the packet transmission time indicated by the first configuration information and the earliest packet transmission time;

sending, by the centralized user configuration function, second latency information to the centralized network configuration function, wherein the second latency information indicates the updated maximum latency;

receiving, by the centralized user configuration function, third configuration information from the centralized network configuration function, wherein the third configuration information indicates a packet transmission time of the transmit end of the TSN stream, and wherein the packet transmission time indicated by the third configuration information is determined based on the updated maximum latency; and sending, by the centralized user configuration function, the third configuration information to the transmit end of the TSN stream.

7. The method according to claim 6, wherein the updated actual buffer duration is greater than the actual buffer duration.

8. The method according to claim 5, wherein the packet transmission time indicated by the first configuration information is the same as the packet transmission time indicated by the second configuration information; and wherein the method further comprises:

sending, by the centralized user configuration function, first information to the centralized network configuration function based on the packet transmission time indicated by the second configuration information, wherein the first information indicates the earliest packet transmission time and an allowed latest packet transmission time of the transmit end of the TSN stream, and wherein the earliest packet transmission time and the latest packet transmission time each are the same as the packet transmission time indicated by the second configuration information.

9. The method according to claim 1, wherein the packet transmission time indicated by the first configuration information is between an allowed earliest packet transmission time of the transmit end of the TSN stream and an allowed latest packet transmission time of the transmit end of the TSN stream; and wherein the method further comprises:

sending, by the centralized user configuration function, first information to the centralized network configuration function based on a maximum buffer duration supported by the transmit end of the TSN stream, wherein the first information indicates the earliest packet transmission time and the latest packet transmission time, and wherein a duration of a difference between the latest packet transmission time and the earliest packet transmission time does not exceed the maximum buffer duration supported by the transmit end of the TSN stream.

10. The method according to claim 9, further comprising:

receiving, by the centralized user configuration function, capability information from the transmit end of the TSN stream, wherein the capability information indicates the maximum buffer duration supported by the transmit end of the TSN stream.

11. The method according to claim 1, wherein the determining, by the centralized user configuration function based on the CN PDB and the buffer duration, the allowed maximum latency of the TSN stream transmitted between the access network device and the user plane network element comprises:

determining, by the centralized user configuration function, the maximum latency based on the CN PDB, the buffer duration, and a residence duration at the user plane network element, wherein the maximum latency does not exceed a difference obtained by subtracting a sum of the buffer duration and the residence duration from the CN PDB.

12. The method according to claim 1, further comprising:

receiving, by the centralized network configuration function, the first latency information from the centralized user configuration function; and sending, by the centralized network configuration function, the first configuration information to the centralized user configuration function.

13. An apparatus, comprising:

at least one processor; and at least one non-transitory computer readable memory connected to the at least one processor and including computer program code, wherein the at least one non-transitory computer readable memory and the computer program code are configured, with the one or more processors, to cause the apparatus to at least:

determine, based on a core network packet delay budget (CN PDB) and a buffer duration, an allowed maximum latency of a time-sensitive network (TSN) stream transmitted between an access network device and a user plane network element, wherein the maximum latency does not exceed a difference obtained by subtracting the buffer duration from the CN PDB, and the access network device is a transmit end of the TSN stream and the user plane network element is a receive end of the TSN stream, or the access network device is a receive end of the TSN stream and the user plane network element is a transmit end of the TSN stream;

send first latency information to a centralized network configuration function, wherein the first latency information indicates the maximum latency;

receive first configuration information from the centralized network configuration function, wherein the first configuration information indicates a packet transmission time of the transmit end of the TSN stream, and wherein the packet transmission time indicated by the first configuration information is associated with the maximum latency; and send the first configuration information to the transmit end of the TSN stream.

14. The apparatus according to claim 13, wherein the at least one non-transitory computer readable memory and the computer program code are configured, with the one or more processors, to further cause the apparatus to determine the buffer duration, wherein the buffer duration comprises an actual buffer duration for buffering a data frame by the transmit end of the TSN stream, or a maximum possible buffer duration for buffering a data frame by the transmit end of the TSN stream.

15. The apparatus according to claim 14, wherein the buffer duration comprises the maximum possible buffer duration, and wherein the at least one non-transitory computer readable memory and the computer program code are configured, with the one or more processors, to further cause the apparatus to determine that the maximum possible buffer duration is a difference between an allowed latest packet transmission time of the transmit end of the TSN stream and an allowed earliest packet transmission time of the transmit end of the TSN stream.

16. The apparatus according to claim 14, wherein the buffer duration comprises the maximum possible buffer duration, and wherein the at least one non-transitory computer readable memory and the computer program code are configured, with the one or more processors, to further cause the apparatus to determine that the maximum possible buffer duration is a smaller one of a duration of a difference between an allowed latest packet transmission time of the transmit end of the TSN stream and an allowed earliest packet transmission time of the transmit end of the TSN stream, and a maximum buffer duration supported by the transmit end of the TSN stream.

17. The apparatus according to claim 14, wherein the buffer duration comprises the actual buffer duration;

the at least one non-transitory computer readable memory and the computer program code are configured, with the one or more processors, to further cause the apparatus to:

receive second configuration information from the centralized network configuration function, wherein the second configuration information indicates a packet transmission time of the transmit end of the TSN stream; and determine that the actual buffer duration is a difference between the packet transmission time indicated by the second configuration information and an allowed earliest packet transmission time of the transmit end of the TSN stream.

18. A non-transitory computer-readable storage medium storing a computer program which is executable on a computer to cause the computer to:

determine, based on a core network packet delay budget (CN PDB) and a buffer duration, an allowed maximum latency of a time-sensitive network (TSN) stream transmitted between an access network device and a user plane network element, wherein the maximum latency does not exceed a difference obtained by subtracting the buffer duration from the CN PDB, and wherein the access network device is a transmit end of the TSN stream and the user plane network element is a receive end of the TSN stream, or the access network device is a receive end of the TSN stream and the user plane network element is a transmit end of the TSN stream;

send first latency information to a centralized network configuration function, wherein the first latency information indicates the maximum latency;

receive first configuration information from the centralized network configuration function, wherein the first configuration information indicates a packet transmission time of the transmit end of the TSN stream, and wherein the packet transmission time indicated by the first configuration information is associated with the maximum latency; and send the first configuration information to the transmit end of the TSN stream.

19. The non-transitory computer-readable storage medium according to claim 18, wherein the computer is further caused to:

determine the buffer duration, wherein the buffer duration comprises an actual buffer duration for buffering a data frame by the transmit end of the TSN stream, or a maximum possible buffer duration for buffering a data frame by the transmit end of the TSN stream.

20. The non-transitory computer-readable storage medium according to claim 19, wherein the buffer duration comprises the maximum possible buffer duration; and wherein the computer is further caused to:

determine that the maximum possible buffer duration is a difference between an allowed latest packet transmission time of the transmit end of the TSN stream and an allowed earliest packet transmission time of the transmit end of the TSN stream.

* * * * *